United States Patent
Bryant-Rich

(10) Patent No.: US 8,359,418 B2
(45) Date of Patent: Jan. 22, 2013

(54) HOST DEVICE WITH USB INTERFACE

(75) Inventor: Donald Ray Bryant-Rich, Haifa (IL)

(73) Assignee: Sandisk IL Ltd., Kfar Saba (IL)

( * ) Notice: Subject to any disclaimer, the term of this patent is extended or adjusted under 35 U.S.C. 154(b) by 268 days.

(21) Appl. No.: 12/393,267

(22) Filed: Feb. 26, 2009

(65) Prior Publication Data

US 2010/0217910 A1 Aug. 26, 2010

(51) Int. Cl.
*G06F 13/00* (2006.01)
*G06F 9/26* (2006.01)

(52) U.S. Cl. ........ 710/301; 361/685; 711/107; 711/154; 711/202

(58) Field of Classification Search .................. 710/301; 361/685; 711/107, 154, 202
See application file for complete search history.

(56) References Cited

U.S. PATENT DOCUMENTS

| | | | |
|---|---|---|---|
| 6,045,384 A | 4/2000 | Norizuki et al. | |
| 6,213,804 B1 | 4/2001 | Matsumura | |
| 6,217,351 B1 | 4/2001 | Fung et al. | |
| 6,567,273 B1 | 5/2003 | Liu et al. | |
| 6,676,420 B1 | 1/2004 | Liu et al. | |
| 6,908,038 B1 * | 6/2005 | Le | 235/492 |
| 7,074,052 B1 | 7/2006 | Ni et al. | |
| 7,104,809 B1 * | 9/2006 | Huang | 439/76.1 |
| 7,114,030 B2 * | 9/2006 | Teicher et al. | 711/115 |
| 7,151,673 B2 | 12/2006 | Le et al. | |
| 7,152,801 B2 | 12/2006 | Cuellar et al. | |
| 7,274,491 B2 * | 9/2007 | Yamada et al. | 358/3.06 |
| 7,310,692 B2 | 12/2007 | Miller et al. | |
| 7,364,436 B2 | 4/2008 | Yen | |
| 7,406,572 B1 * | 7/2008 | Nguyen | 711/154 |
| 7,466,556 B2 | 12/2008 | Hiew et al. | |
| 7,479,042 B2 * | 1/2009 | Chen | 439/660 |
| 7,481,659 B2 | 1/2009 | Johnson et al. | |
| 7,491,076 B2 | 2/2009 | Gu et al. | |
| 7,535,718 B2 | 5/2009 | Le | |
| 7,597,268 B2 * | 10/2009 | Jones et al. | 235/492 |
| 7,719,847 B2 * | 5/2010 | Mambakkam et al. | 361/737 |
| 2002/0166009 A1 | 11/2002 | Lin | |
| 2003/0100203 A1 | 5/2003 | Yen | |
| 2003/0191882 A1 * | 10/2003 | Chang | 710/301 |
| 2004/0033727 A1 | 2/2004 | Kao | |
| 2004/0054863 A1 * | 3/2004 | Harada et al. | 711/164 |
| 2004/0088449 A1 * | 5/2004 | Sakaki | 710/15 |
| 2004/0148450 A1 * | 7/2004 | Chen et al. | 710/313 |
| 2004/0153597 A1 * | 8/2004 | Kanai et al. | 710/305 |

(Continued)

OTHER PUBLICATIONS

"CF+ and CompactFlash Specification", Feb. 16, 2007, revision 4.1, CompactFlash Association, 194 pages.

(Continued)

*Primary Examiner* — Paul R Myers
*Assistant Examiner* — Christopher A Daley
(74) *Attorney, Agent, or Firm* — Toler Law Group, PC

(57) ABSTRACT

An apparatus includes a first Universal Serial Bus (USB) connector and a card holder associated with the first USB connector. A controller including a USB host interface is coupled to the first USB connector. A housing enclosing the controller and at least partially enclosing the card holder has an opening that is dimensioned to enable insertion of a memory card into the card holder. The first USB connector is configured to connect to a second USB connector of the memory card when the memory card is inserted into the card holder.

28 Claims, 17 Drawing Sheets

U.S. PATENT DOCUMENTS

| | | | |
|---|---|---|---|
| 2004/0174683 | A1 | 9/2004 | McGowan |
| 2005/0059273 | A1 | 3/2005 | Chiou et al. |
| 2005/0070138 | A1 | 3/2005 | Chiou et al. |
| 2005/0085133 | A1 | 4/2005 | Wang et al. |
| 2005/0086413 | A1* | 4/2005 | Lee et al. ............... 710/313 |
| 2005/0197017 | A1 | 9/2005 | Chou et al. |
| 2006/0278723 | A1 | 12/2006 | Dan et al. |
| 2007/0168668 | A1 | 7/2007 | Chang et al. |
| 2007/0178769 | A1 | 8/2007 | Ni |
| 2007/0184719 | A1 | 8/2007 | Ni et al. |
| 2007/0197101 | A1 | 8/2007 | Ni et al. |
| 2008/0032561 | A1 | 2/2008 | Hiew et al. |
| 2008/0062624 | A1 | 3/2008 | Regen et al. |
| 2008/0067248 | A1 | 3/2008 | Hiew et al. |
| 2008/0096429 | A1 | 4/2008 | Mikolajczak et al. |
| 2008/0140887 | A1 | 6/2008 | Gallant et al. |
| 2008/0227337 | A1* | 9/2008 | Jow ............... 439/630 |
| 2009/0002548 | A1 | 1/2009 | Liang et al. |
| 2009/0255991 | A1* | 10/2009 | Liao et al. ............... 235/441 |
| 2009/0289119 | A1* | 11/2009 | Liao et al. ............... 235/441 |
| 2009/0321530 | A1* | 12/2009 | Harari et al. ............... 235/492 |
| 2010/0023669 | A1* | 1/2010 | Lee ............... 710/301 |
| 2010/0216341 | A1 | 8/2010 | Bryant-Rich |

OTHER PUBLICATIONS

"PC Card Standard, Physical Specification", 2001, vol. 3, PCMCIA/JEITA, 70 pages.

"Universal Serial Bus 3.0 Specification", Nov. 12, 2008, revision 1.0, 482 pages.

Bryant-Rich, Donald Ray. "Memory Card and Host Device," U.S. Appl. No. 12/393,457, filed Feb. 26, 2009, 51 pages.

"IEEE Standard for a High-Performance Serial Bus," IEEE Std 1394™-2008, Oct. 21, 2008, 954 pages.

Notice of Allowance and Fees Due mailed Dec. 13, 2011 in U.S. Appl. No. 12/393,457, 5 pages.

Notice of Allowance and Fees Due mailed Sep. 7, 2011 in U.S. Appl. No. 12/393,457, 9 pages.

Non-Final Office Action mailed Apr. 4, 2011 in U.S. Appl. No. 12/393,457, 9 pages.

Multigig MQC102 and MQC202 Production Programming, AN1115 Rev A, 12 pages, Aug. 2011, formerly available on World Wide Web site multigig.com.

Multigig MQC102B, 2.5V and 3.3V LVDS, LVCMOS, HCSL or LVPECL Crystal Oscillator with Multiplying PLL, Product Description, 13 pages, May 2011, formerly available on World Wide Web site multigig.com.

* cited by examiner

HOST DEVICE WITH USB INTERFACE

FIELD OF THE DISCLOSURE

The present disclosure is generally related to memory cards and host devices.

BACKGROUND

Non-volatile semiconductor memory devices, such as removable memory cards, have enabled increased portability of data and software applications. Various devices, such as cameras, phones, personal digital assistants, and printers, have internal card holders to receive removable memory cards for data storage. Often, such devices can also be coupled to an external host, such as a personal computer, for data transfer between the device and the external host. Conventionally, data and instructions may be transferred between the device and the external host according to a Universal Serial Bus (USB) specification or an Institute of Electrical and Electronic Engineers (IEEE) 1394 interface standard, also known as the Firewire standard.

Data and instructions are conventionally transferred between the device and the removable memory card via a standard other than a USB or an IEEE 1394 interface standard. For example, communication between the device and the memory card can comply with a Personal Computer Memory Card International Association (PCMCIA) standard, such as a PC Card standard, or a flash memory card standard, such as a CompactFlash (CF), Secure Digital (SD) or Multimedia Card (MMC) standard. As a result, the device typically implements multiple protocols and provides translations between the protocols to enable communication between the external host and the removable memory card. Implementing multiple protocols and providing translations between the protocols may increase the cost and complexity of such devices and may consume additional processing resources and physical space on the non-volatile memory device.

SUMMARY

Devices are disclosed that include USB or IEEE 1394 connectors and card holders associated with the USB or IEEE 1394 connectors. For example, a device may include a controller including a USB host interface. The USB connector enables communication with a memory card having a USB connector when the memory card is inserted into the card holder. A housing enclosing the controller and at least partially enclosing the card holder may have an opening that is dimensioned to enable insertion of the memory card into the card holder. Communication may be enabled between the memory card and an external host via the device that houses the memory card without protocol translation by the device.

DETAILED DESCRIPTION

Figure 1:
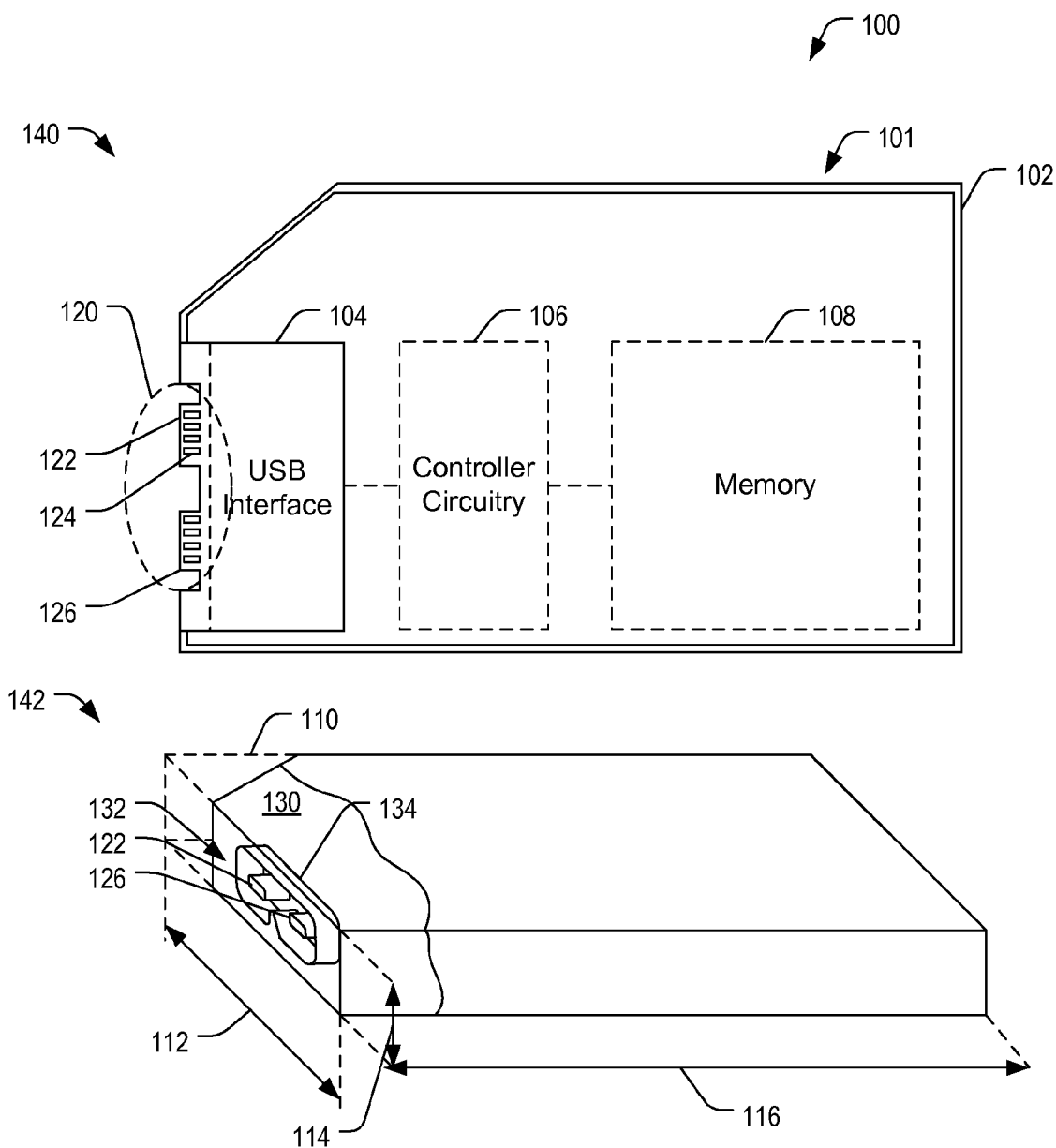
FIG. 1 is a general diagram of a first illustrative embodiment of a memory card having a USB interface, the memory card including a memory card structure and an electrical connector portion of a USB compatible receptacle that is attached to remain stationary within an edge connector portion of the memory card structure.

Referring to FIG. 1, a first illustrative embodiment 100 of a storage device, such as a memory card 101, is shown having a USB interface 104 and an electrical connector portion 120 of a USB compatible receptacle 132. In this embodiment, the USB compatible receptacle 132 is attached within an edge connector portion 130 of a memory card structure 102 to remain stationary with respect to the memory card structure 102. The memory card 101 is depicted in a top cross-sectional view 140 and a partial cutaway perspective view 142. The memory card 101 includes a memory card structure 102 that encloses a USB interface 104 and that may at least partially enclose a memory 108 and controller circuitry 106 coupled to the USB interface 104. By incorporating the USB interface 104 within the memory card 101, data may be accessed at the memory 108 using USB protocol commands and standard USB interconnection equipment, such as USB cables. The memory card 101 may be used with existing hardware that is configured to hold conventional memory cards according to various memory card specifications, such as PCMCIA or flash memory card specifications such as CompactFlash (CF), Secure Digital (SD), microSD, other memory card specifications, or any combination thereof.

As illustrated, the USB interface 104 includes the electrical connector portion 120 of the USB compatible receptacle 132. The electrical connector portion 120 may include a first set of contacts 122 and a second set of contacts 126 in accordance with USB 3.0 or a single set of contacts 126 in accordance with USB 2.0. The first set of contacts 122 and the second set of contacts 126 may each include multiple electrically conductive portions, such as a representative contact 124. The electrical connector portion 120 of the USB compatible receptacle 132 may be configured to substantially match a USB specification shape and size form factor for the connector. For example, the electrical connector portion 120 and a metal shield 134 that at least partially surrounds the electrical connector portion 120 may substantially comply with the electrical connector portion of a USB micro-B specification.

The memory card structure 102 and the USB compatible receptacle 132 have outer dimensions not exceeding a bounding box 110 formed of a width dimension 112, a length dimension 116, and a thickness dimension 114 of an edge connector portion 130. These dimensions are compatible with a flash memory card specification, such as a CompactFlash specification, a Secure Digital (SD) specification, a miniSD specification, a microSD specification or a Multimedia Card (MMC) specification, or a PCMCIA specification. As illustrated, the thickness dimension 114 is smaller than the width dimension 112 and is also smaller than the length dimension 116.

The electrical connector portion 120 is attached within the edge connector portion 130 to remain stationary with respect to the memory card structure 102. The electrical connector portion 120 may be immovable with respect to the memory card structure 102. For example, the electrical connector portion 120 may be mounted or attached to the edge connector portion 130 of the memory card structure 102 or to a substrate (not shown), such as a printed circuit board, that is attached to the memory card structure 102. The electrical connector portion 120 may be attached via adhesive, mechanical fasteners, or other fastening techniques. For example, the electrical connector portion 120 may be integrated into the memory structure 102 via a molding process that forms the memory structure 102. As a result of the electrical connector portion 120 being mounted and remaining immobile with respect to the memory card structure 102 during operation, the memory card 101 may be more durable and less expensive to produce as compared to a storage device having a sliding or other user-movable connection component.

In a particular embodiment, the memory card structure 102 of the memory card 101 may substantially conform to physical dimensional specifications of one or more particular memory card types. For example, the memory card structure 102 may substantially conform to a shape and size form factor of a memory card specification. In another embodiment, however, only the edge connector portion 130 of the memory card structure 102 complies with a shape and size form factor of the memory card specification. For example, the edge connector portion 130 may be dimensioned to be inserted into existing memory card holders that have been modified to include USB connectors.

Figure 2:
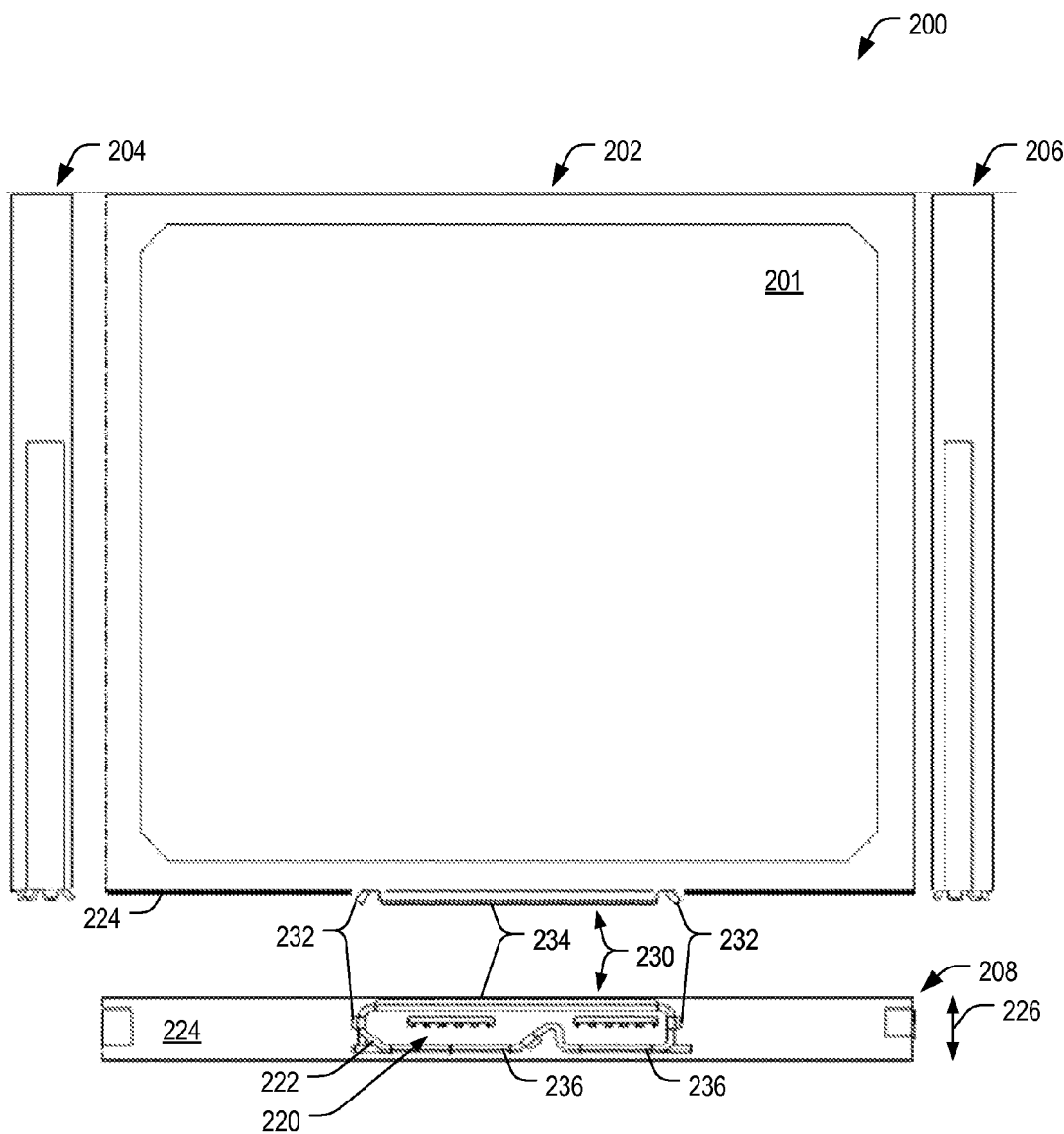
FIG. 2 is a general diagram of a second illustrative embodiment of a memory card having a USB interface.

Referring to FIG. 2, a particular embodiment of a memory card 201 having a USB interface is depicted and generally designated 200. The memory card 201 is depicted in a top view 202, a left edge view 204, a right edge view 206, and a front edge view 208. The memory card 201 includes a USB compliant connector, such as a USB connector 230, that is partially or fully recessed within an edge connector portion 224 of the memory card 201. As illustrated, the USB connector 230 is a USB receptacle, such as a USB 3.0 micro-B receptacle, that is at least partially disposed within the memory card structure and that is attached within the edge connector portion 224 to remain stationary with respect to the memory card 201.

The USB connector 230 has left and right insertion guides 232. In addition, the USB connector 230 may also include a top insertion guide 234 and a bottom insertion guide 236. The insertion guides 232-236 may assist connection of a USB plug into the USB connector 230. At least one insertion guide 232-236 protrudes beyond or outside of an edge of the edge connector portion 224. In the illustrated embodiment, the entire USB connector 230 other than the insertion guides 232-236, such as an entire electrical connector portion 220, is recessed within the edge connector portion 224 and internal to the memory card structure that houses the USB compliant connector 230.

The USB connector 230 includes the electrical connector portion 220 and a conducting shield portion 222. For example, the conducting shield portion 222 may be a metal shield that substantially surrounds the electrical connector portion 220 for electromagnetic shielding. Although one or more insertion guides 232-236 may protrude beyond the edge connector portion 224, in a particular embodiment the entire electrical connector portion 220 is internal to the memory card 201 and does not extend outside of the edge connector portion 224.

As illustrated, the edge connector portion 224 of the memory card 201 has a top-to-bottom thickness 226. In a particular embodiment, the thickness 226 is less than or equal to approximately 3.3 millimeters. For example, the memory card 201 may have a shape and size form factor that complies with a CompactFlash Type 1 storage card specification that indicates that the thickness 222 is less than 3.4 millimeters, such as a nominal thickness of 3.3 millimeters and a tolerance of 0.05 millimeters.

Figure 3:
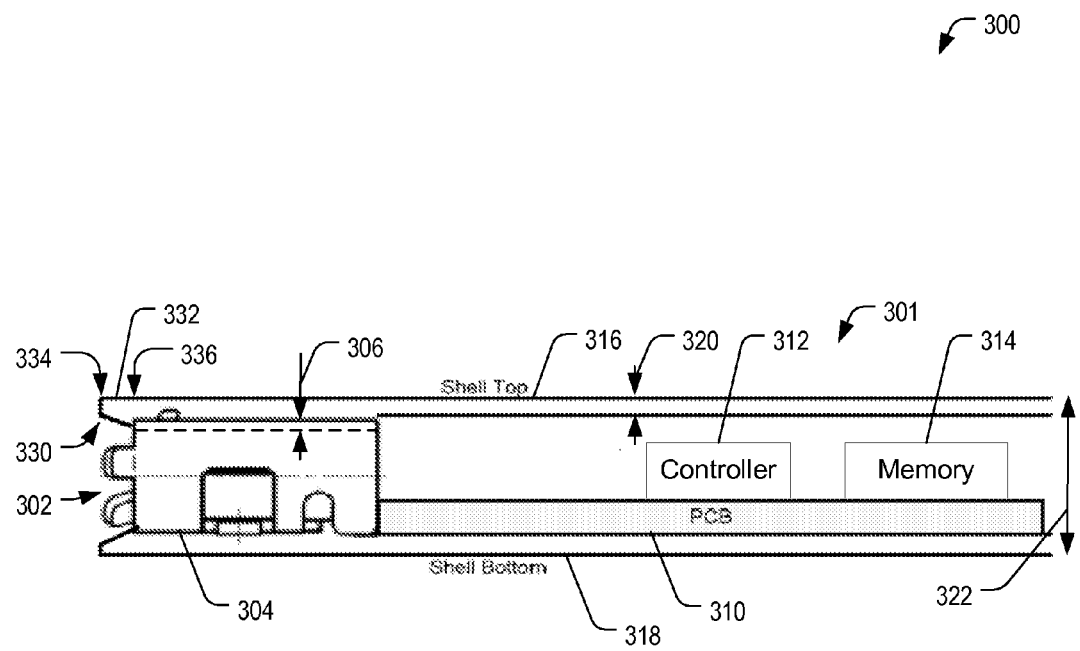
FIG. 3 is a general diagram of a third illustrative embodiment of a memory card having a USB interface.

Referring to FIG. 3, a third particular embodiment of a memory card 301 having a USB interface is depicted and generally designated 300. The memory card 301 is illustrated in cross-section to reveal internal details of the memory card 301. In a particular embodiment, the memory card 301 may have a shape and size form factor that substantially complies to a memory card specification such as the CompactFlash Type I specification.

The memory card 301 includes a USB receptacle 302 that has a shield portion 304. The shield portion 304 has a metal thickness 306. The USB receptacle 302 is coupled to a printed circuit board (PCB) 310. Electrical traces (not shown) may electrically couple contacts of an electrical connector portion (not shown) of the USB receptacle 302 to a memory 314 via a controller 312. The memory 314 and the controller 312 may be electrically and physically coupled to the PCB 310. The electrical connector portion of the USB receptacle 302 is recessed within a region of an edge connector portion of the memory card 301. The electrical connector portion of the USB receptacle 302 may be attached to the PCB 310 and may remain stationary with respect to the PCB 310 during normal operation.

A top and bottom surface of the memory card 301 are formed by a memory card structure that encloses the PCB 310 and the USB receptacle 302, such as a shell top 316 and a shell bottom 318. At least one of the shell top 316 or the shell bottom 318 has a shell wall thickness 320. The shell wall thickness 320, the metal thickness 306, or both, may be modified so that an overall thickness 322 of the memory card structure, at least in the proximity to the USB receptacle 302, complies with a shape and size form factor of a memory card specification. For example, in an embodiment where the USB receptacle 302 is a USB micro-B receptacle without top and bottom insertion guides, the USB micro-B receptacle having a specified metal thickness 306 of 0.15 millimeters (mm) could fit in a shape and size form factor of a CompactFlash Type I memory card specification if the overall thickness 322 is greater than a 2.1 mm height specified in the memory card specification, but still within an allowed variance at 2.15 mm. In an alternative embodiment, the metal thickness 306 of the receptacle could be reduced to 0.125 mm to meet the 2.1 mm specified card height.

In a particular embodiment, the USB receptacle 302 has a shape and size form factor that complies with a USB 2.0 or USB 3.0 micro-B specification. However, a top and bottom insertion guide of the USB receptacle 302 in compliance with a USB micro-B specification may extend above and below the USB receptacle 302 to a distance that causes the shell top 316 and shell bottom 318 to be undesirably thin when the overall thickness 322 complies with a memory card specification. Therefore, a top and bottom insertion guide of the USB receptacle 302 may not be formed by the metal shield 304 and may instead be formed by the memory card structure, such as by the shell top 316 and the shell bottom 318. To illustrate, a top insertion guide 330 is formed from an elongated tapered portion 332 of the memory card structure. The elongated tapered portion 332 has a first thickness 334 at the edge of the memory card structure formed of the shell top 316, and a second thickness 336 at the USB receptacle 302. The first thickness 334 at the edge is less than the second thickness 336 at the USB receptacle 302, providing an effective insertion guide that is substantially equivalent to the top insertion guide indicated by the USB micro-B receptacle physical specification. Similarly, the shell bottom 318 may have an elongated portion that may form a bottom insertion guide.

Figure 4:
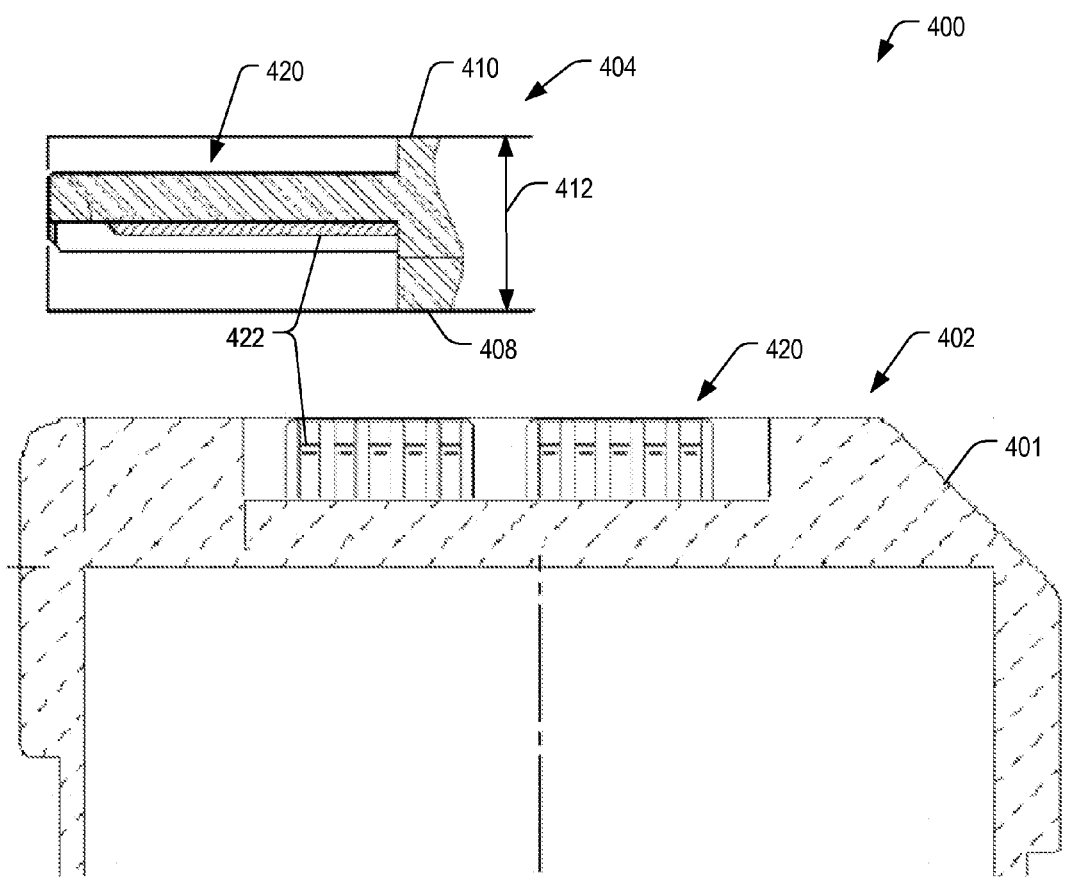
FIG. 4 is a general diagram of a fourth illustrative embodiment of a memory card having a USB interface.

Referring to FIG. 4, a fourth particular embodiment of a memory card 401 having a USB interface is depicted and generally designated 400. The memory card 401 is illustrated in a top view 402 and a cross sectional side view 404. The memory card 401, as illustrated in the cross sectional side view 404, may be formed of a bottom substrate 408 onto which one or more components, such as a memory, a controller, or any combination thereof, may be mounted and electrically coupled to an electrical connector portion 420 of a USB receptacle. The electrical connector portion 420 may be substantially similar to the electrical connector portion 122 of FIG. 1 or the electrical connector portion 220 of FIG. 2. The substrate 408 may be covered with a top material 410 to form a memory card structure that does not have a substantially hollow interior, as opposed to the memory card 301 depicted in FIG. 3.

As illustrated, the memory card structure has a thickness 412 that may substantially comply with one or more memory card specifications. For example, the thickness 412 may be less than 1.5 millimeters, such as for example, 1.4 millimeters, to comply with a shape and size form factor of a miniSD flash memory card specification. As another example, the thickness 412 of the memory card structure may be less than approximately 1.1 millimeters, such as for example, 1.0 millimeters, to substantially comply with a shape and size form factor of a microSD flash memory card specification.

Because the thickness 412 of the memory card structure may be smaller than a thickness of a metal or conductive shield of a USB receptacle, such as the shield 304 depicted in FIG. 3, the memory card 401 may optionally include the electrical connector portion 420 of the USB receptacle but not include the metal shield portion of the USB receptacle. As illustrated, the electrical connector portion 420 may substantially correspond to the electrical connector portion of a USB 3.0 micro-B receptacle. For example, the electrical connector portion 420 has multiple electrical contacts, such as a representative contact 422. When coupled to a mating USB plug, each contact 422 enables data transfer or signaling between the memory card 401 and a device coupled to the mating USB plug (not shown).

Figure 5:
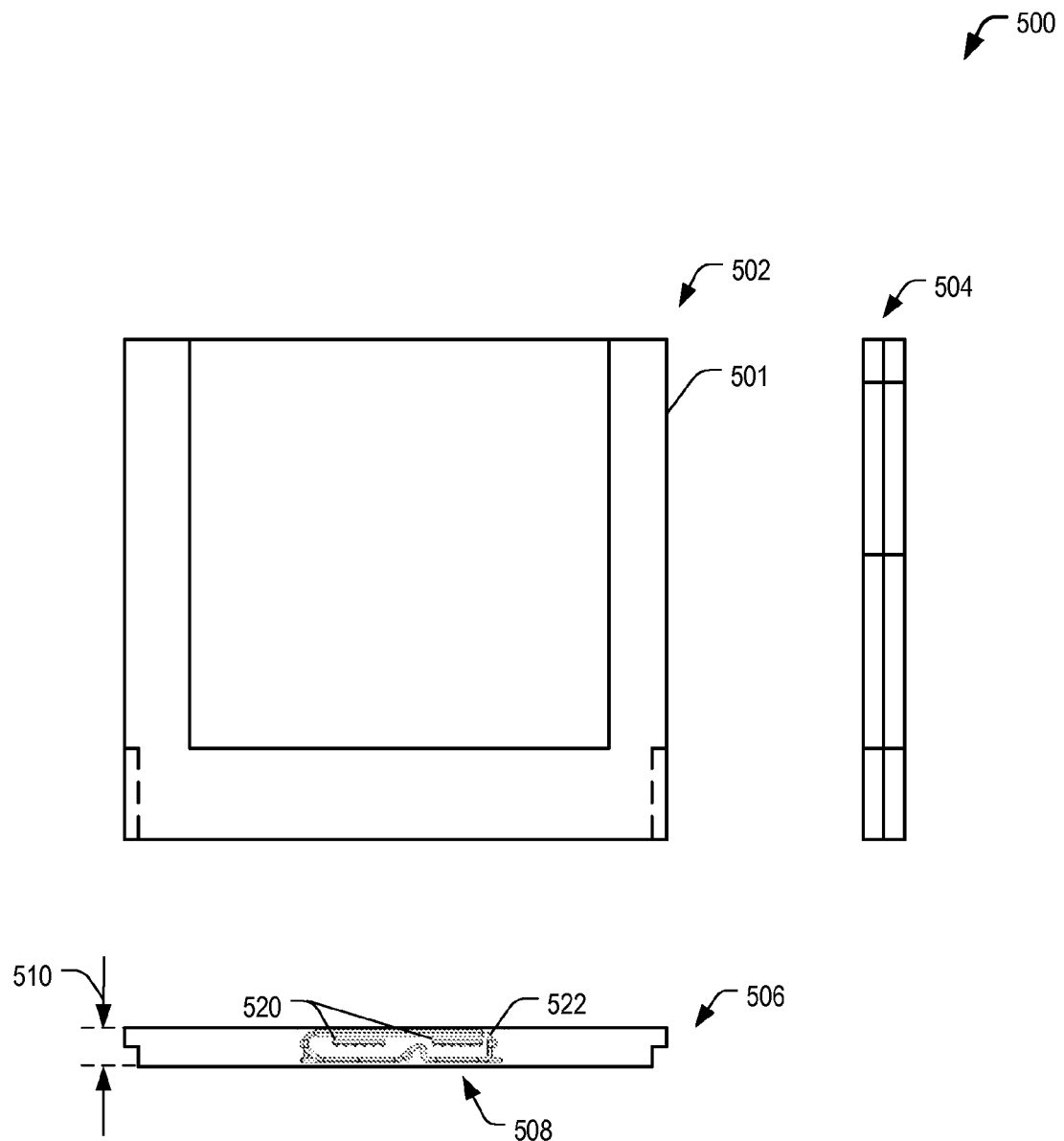
FIG. 5 is a general diagram of a fifth illustrative embodiment of a memory card having a USB interface.

Referring to FIG. 5, a fifth embodiment of a memory card 501 having a USB interface is depicted and generally designated 500. The memory card 501 is shown in a top view 502, a side view 504, and a front view 506. As illustrated, the memory card 501 has a form factor that substantially conforms to a Personal Computer Memory Card International Association (PCMCIA) specification, such as a PC Card specification. However, as illustrated in the front view 506, the memory card 501 does not have a PCMCIA electrical interface. Instead, the memory card 501 has a USB connector, such as the USB receptacle 508. The USB receptacle 508 has an electrical connector portion 520 and a metal shield portion 522. As illustrated, an edge connector portion of the memory card structure at the USB receptacle 508 may be dimensioned to have a size and shape form factor, including a thickness 510, that complies with a PCMCIA specification.

Although the memory cards depicted in FIGS. 1-5 are illustrated as including USB connectors, in other embodiments one or more of the memory cards may instead, or additionally, include receptacles that substantially comply with an IEEE 1394 interface standard. For example, one or more of the memory cards depicted in FIGS. 1-5 may include a four-circuit Firewire-type connector in place of the USB connector. As another example, one or more of the memory cards depicted in FIGS. 1-5 may include an electrical connector portion of a six-circuit Firewire-type connector, such as depicted in FIGS. 6-9.

Figure 6:
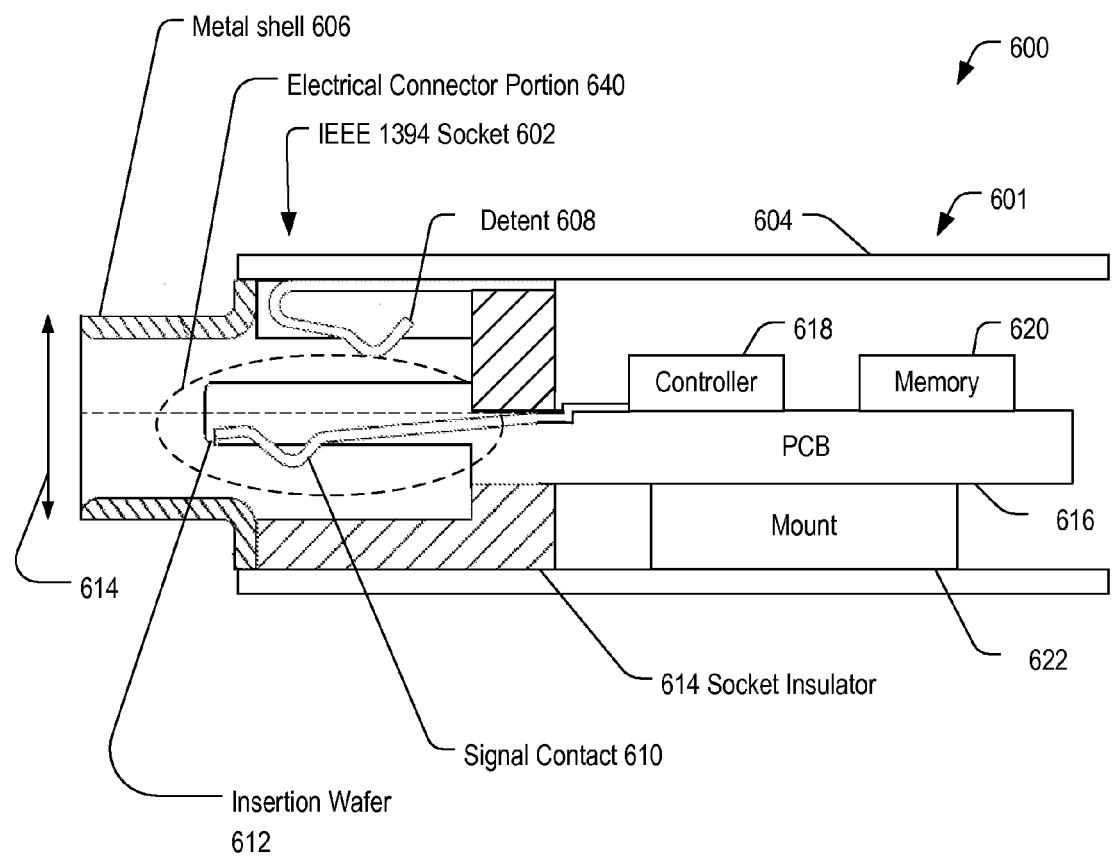
FIG. 6 is a general diagram of a first illustrative embodiment of a memory card having an IEEE 1394 interface.

Referring to FIG. 6, a first embodiment of a memory card having an IEEE 1394 interface is depicted and generally designated 600. The memory card 601 includes an IEEE 1394 receptacle or socket 602, such as a six-circuit Firewire-type socket, that is attached to a memory card structure 604.

The IEEE 1394 socket 602 includes an electrical connector portion 640 that includes an insertion wafer 612 and multiple signal contacts, such as a representative signal contact 610. A metal shell 606 at least partially surrounds the electrical connector portion 640 to provide electromagnetic shielding and has an opening to enable access for connection with an IEEE 1394 plug (not shown). A detent 608 is positioned and spring-biased to assist in maintaining an attachment to an IEEE 1394 plug that may be connected to the IEEE 1394 socket 602. An edge connector portion of the memory card 601 may have a thickness 614 of approximately 6.7 millimeters and may comply with a thickness or a shape and size form factor of a flash memory card specification or a PCMCIA specification.

The electrical connector portion 640 is attached to a printed circuit board (PCB) 616. As illustrated, the electrical connector portion 640 may be formed to include at least a portion of an edge of the PCB 616 so that the insertion wafer 612 and the PCB 616 are integrated on a single piece of material. In other embodiments, the electrical connector portion 640 may be attached to the PCB 616 to remain stationary with respect to the PCB 616. A controller 618 that is coupled to the electrical connector portion 640 is coupled to the PCB 616. A memory 620 is coupled to the controller 618 and to the PCB 616.

The memory card structure 604 is illustrated as a shell top and a shell bottom. The memory card structure 604 can be attached to the IEEE 1394 socket 602 via connection to the metal shell 606, connection to a socket insulator 614, or both. The memory card structure 604 may also be attached to the PCB 616 via a mount 622. For example, the mount 622 may be a structural element that supports and connects the PCB 616 to the memory card structure 604 to hold the PCB 616 stationary with respect to the memory card structure 604. As a result of mechanical connections between the metal shell 606, the insertion wafer 612, the socket insulator 614, the PCB 616, the mount 622, and the memory card structure 604, the electrical connector portion 640 of the IEEE 1394 socket 602 may remain stationary and substantially or fully immobile with respect to the memory card structure 604.

Figure 7:
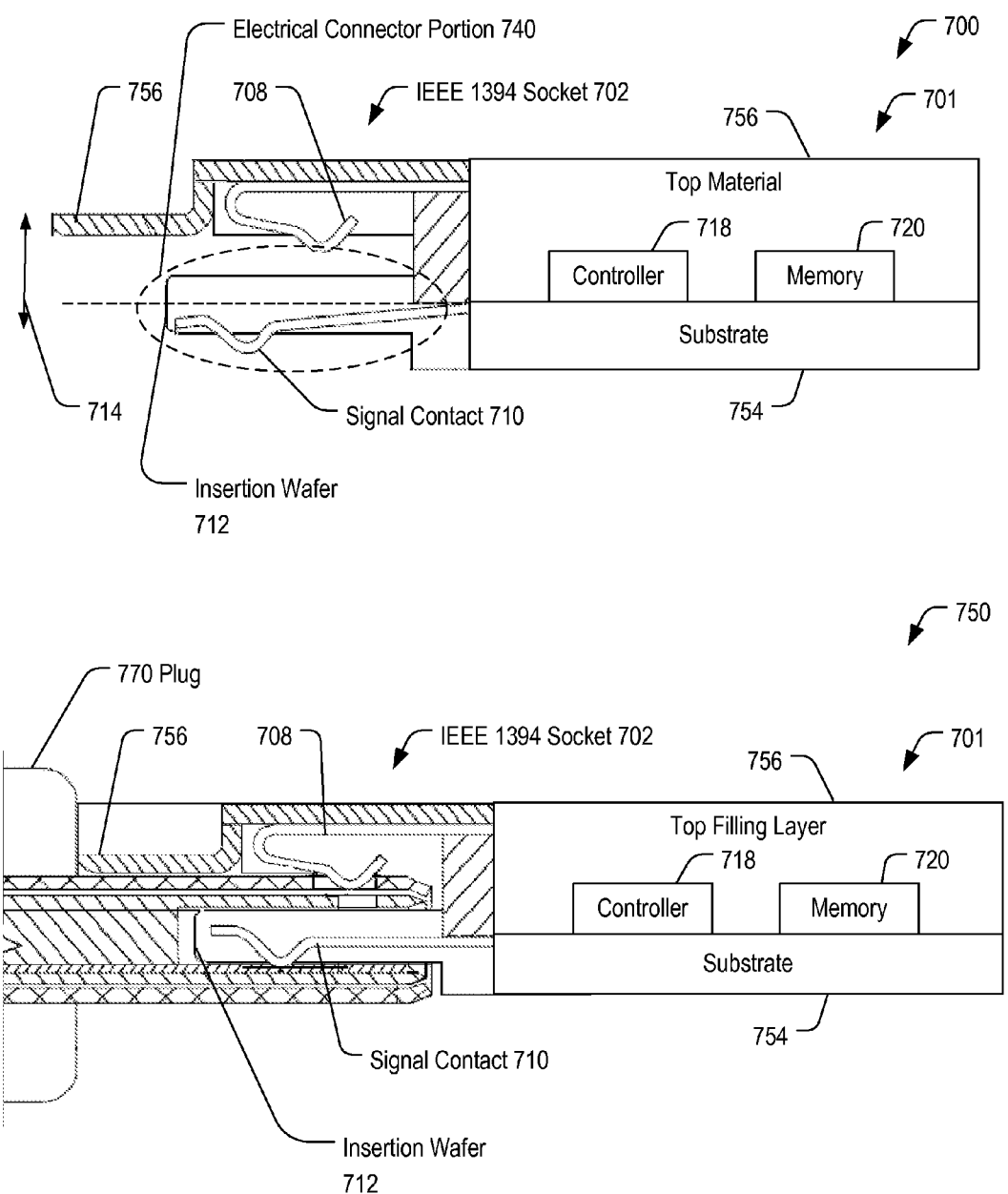
FIG. 7 is a general diagram of a second illustrative embodiment of a memory card having an IEEE 1394 interface.

Referring to FIG. 7, a second embodiment of a memory card having an IEEE 1394 interface is depicted and generally designated 700. The memory card 701 includes an IEEE 1394 socket 702, such as a six-circuit socket that is substantially compliant with an IEEE 1394 interface standard, with a reduced height compared to the IEEE 1394 socket 602 of FIG. 6.

The IEEE 1394 socket 702 includes an electrical connector portion 740 that may be substantially similar to the electrical connector portion 640 of FIG. 6. The electrical connector portion 740 includes an insertion wafer 712 and multiple signal contacts, such as a representative signal contact 710. The IEEE 1394 socket 702 has a detent 708 and a top portion of a metal shield 756. The IEEE 1394 socket 702 does not include a bottom portion of the metal shield 756, resulting in a reduced thickness compared to the IEEE 1394 socket 602 of FIG. 6. For example, an edge connector portion of the memory card 701 may have a thickness 714 of approximately 4.2 millimeters and may comply with a thickness or a shape and size form factor of a flash memory card specification or a PCMCIA specification.

The electrical connector portion 740 is attached to a memory card structure that includes a substrate 754 and a top material 756 to remain stationary with respect to the memory card structure. In a particular embodiment, the insertion wafer 712 may be formed as part of the substrate 754. In another embodiment, the insertion wafer 712 may be attached to the substrate 754 to remain immobile with respect to the substrate 754. A controller 718 and a memory 720 may be coupled to the substrate 754 and to the electrical connector portion 740.

The memory card 701 is illustrated in a second embodiment 750 coupled to a plug 770, such as an IEEE 1394 plug. As illustrated, the plug 770 is configured to surround the insertion wafer 712 beneath the metal shield 756 when connected. The plug 770 establishes an electrical connection with the memory card 701 via the signal contact 710.

Figure 8:
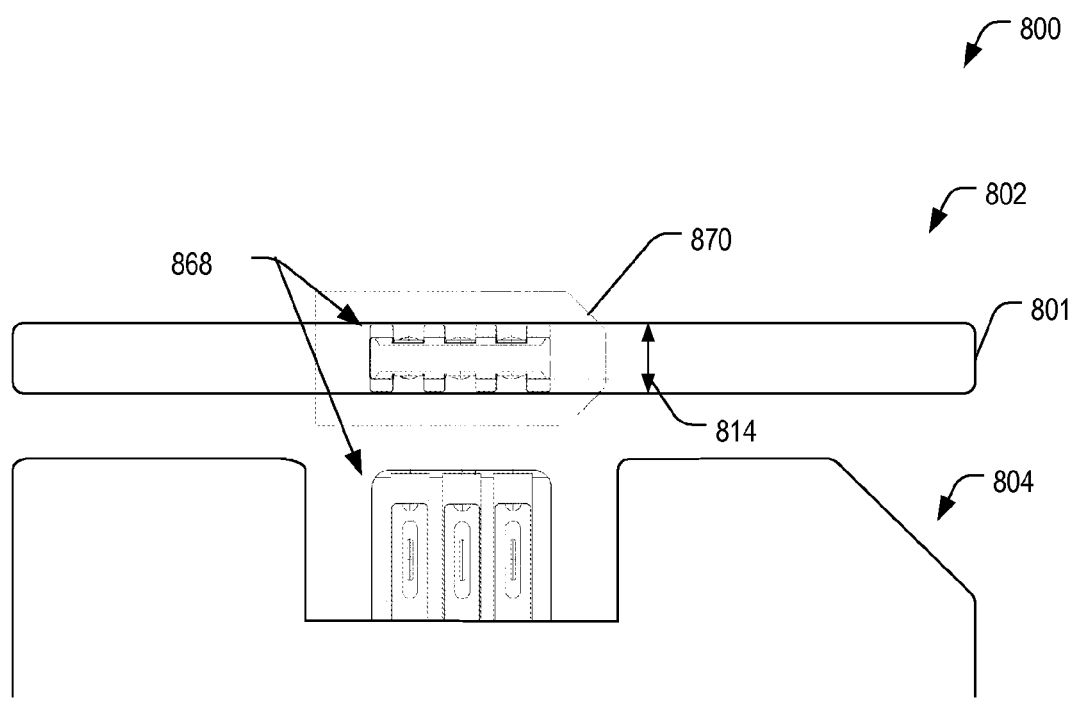
FIG. 8 is a general diagram of a third illustrative embodiment of a memory card having an IEEE 1394 interface.

Referring to FIG. 8, a third embodiment of a memory card having an IEEE 1394 interface is depicted and generally designated 800. The memory card 801 is illustrated in a front view 802 and a top view 804. The memory card 801 includes an electrical connector portion 868 of an IEEE 1394 socket, such as an electrical connector portion of a six-circuit socket that is substantially compliant with an IEEE 1394 interface standard. In an illustrative embodiment, the electrical connector portion 868 may be substantially similar to the electrical connector portion 640 of FIG. 6 or the electrical connector portion 740 of FIG. 7.

The memory card 801 does not include a metal shell, such as the metal shell 606 of FIG. 6 or the metal shell 756 of FIG. 7. A phantom outline 870 illustrates a size and position of the metal shell 606 of FIG. 6 relative to the size and position of the electrical connector portion 868. By not including a metal shell portion, an edge connector portion of the memory card 801 may have a smaller thickness than an edge connector portion of the memory card 601 of FIG. 6 and the memory card 701 of FIG. 7. For example, an edge connector portion of the memory card 801 may have a thickness 814 of approximately 1.6 millimeters and may comply with a thickness or a shape and size form factor of a flash memory card specification, such as a CompactFlash Type I specification, or a PCMCIA specification.

Figure 9:
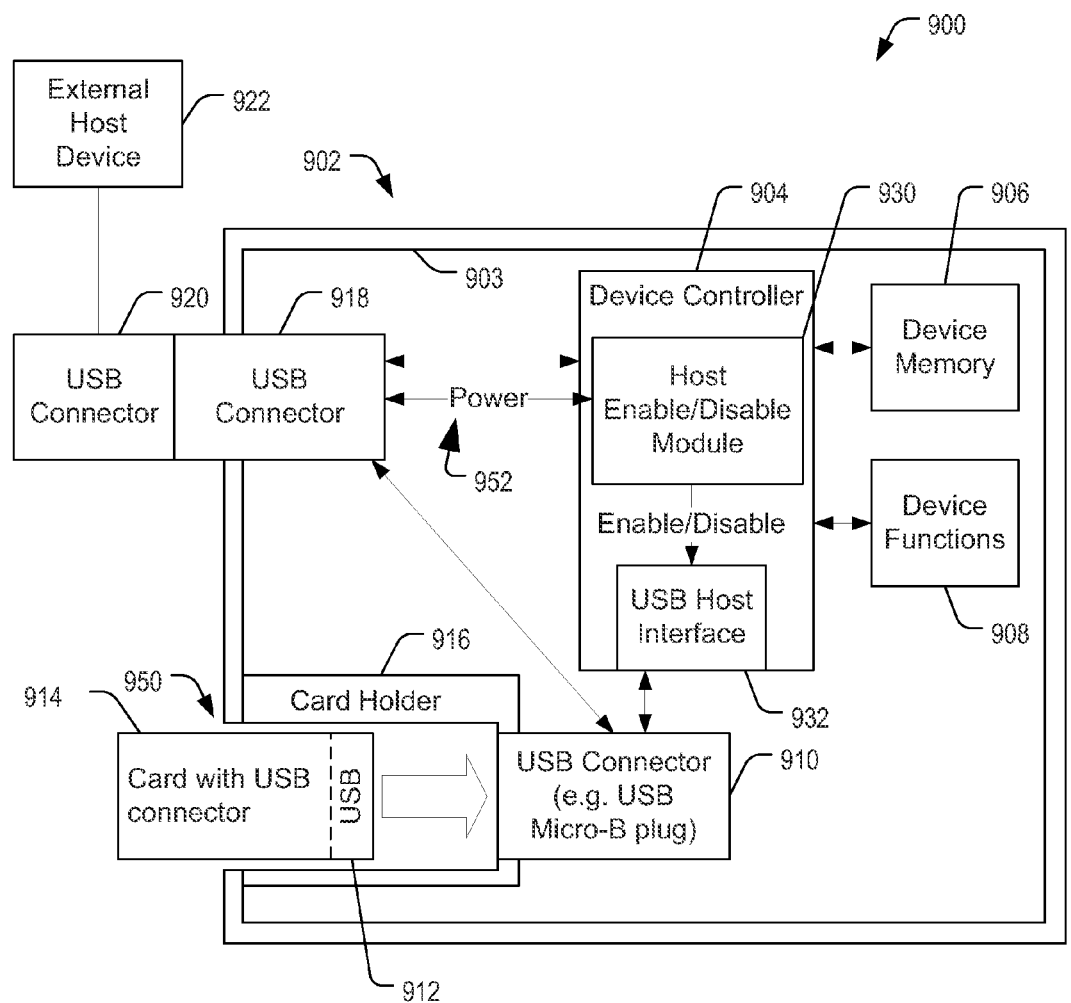
FIG. 9 is a block diagram of a first illustrative embodiment of a system including a card holder to receive a memory card having a USB interface.

Referring to FIG. 9, a particular embodiment of a system including a card holder to receive a memory card having a USB interface is depicted and generally designated 900. The system 900 includes a device 902 coupled to a memory card 914 having a USB connector 912. The device 902 is also coupled to an external host device 922. In a particular embodiment, the memory card 914 is the card 101 of FIG. 1, the memory card 201 of FIG. 2, the memory card 301 of FIG. 3, the memory card 401 of FIG. 4, or the memory card 501 of FIG. 5.

In a particular embodiment, the device 902 includes a housing 903 that encloses a device controller 904. The device controller 904 is coupled to a device memory 906 and is also coupled to access one or more device functions 908. The device controller 904 is also coupled to a first USB connector 910 that may be secured within the housing 903, such as a USB plug or a USB receptacle. In a particular embodiment, the first USB connector 910 is compliant with a USB micro-B physical specification, such as a USB 3.0 or USB 2.0 micro-B plug.

The housing 903 at least partially encloses a card holder 916. The housing 903 has an opening 950 that is dimensioned to enable insertion of the memory card 914 into the card holder 916. The card holder 916 may be dimensioned to receive and to hold a card having a shape and size form factor complying with a memory card specification, such as the memory card 914 having the USB connector 912. In addition, the first USB connector 910 may be configured to electrically connect or couple to the USB connector 912 of the memory card 914 when the memory card 914 is inserted within the card holder 916. The device 902 also includes a third USB connector 918 that is electrically coupled to the device controller 904 and further electrically coupled to the first USB connector 910. In a particular embodiment, the third USB connector 918 is configured to couple to a USB connector 920 coupled to the external host device 922 to enable communication with the external host device 922. For example, the device 902 may include a digital camera and the external host device 922 may be a personal computer or laptop computer that can download image files from the device 902. As other examples, the device 902 may be a cellular phone or mobile phone, a game console, a media recorder or player, a personal digital assistant (PDA), a printer, or any other device that may receive and interact with a memory card and that may be coupled to an external host device.

In a particular embodiment, the device controller 904 includes a host enable/disable module 930 and the device controller 904 also includes a USB host interface 932. When the device controller 904 detects that the third USB connector 918 is not coupled to the external host device 922 (e.g. the USB connector 920 is not coupled to the third USB connector 918), the device controller 904 may enable operation of the USB host interface 932. The USB host interface 932 may be configured to act as a host to the memory card 914 via the first USB connector 910 coupled to the USB connector 912 of the memory card 914.

The host enable/disable module 930 is configured to detect when power is received on a power line 952. Detecting power on the power line 952 indicates that a host device, such as the external host device 922, is coupled to the third USB connector 918. When the device controller 904 recognizes that power is being supplied on the power line 952, the host enable/disable module 930 may disable operation of the USB host interface 932 from operating as a USB host to the memory card 914, and the first USB connector 910 may receive signaling from the third USB connector 918 that is coupled to the external host 922 via the USB connector 920.

Thus, data and other functions that may be associated with the memory card 914 may be accessible to the external host device 922 by coupling the first USB connector 910 to the third USB connector 918 and disabling the USB host interface 932. When the external host device 922 is determined to be uncoupled to the third USB connector 918, the device controller 904 may be configured to enable the USB host interface 932 so that the device controller 904 may communicate with the memory card 914 via a USB command and data transfer protocol.

Figure 10:
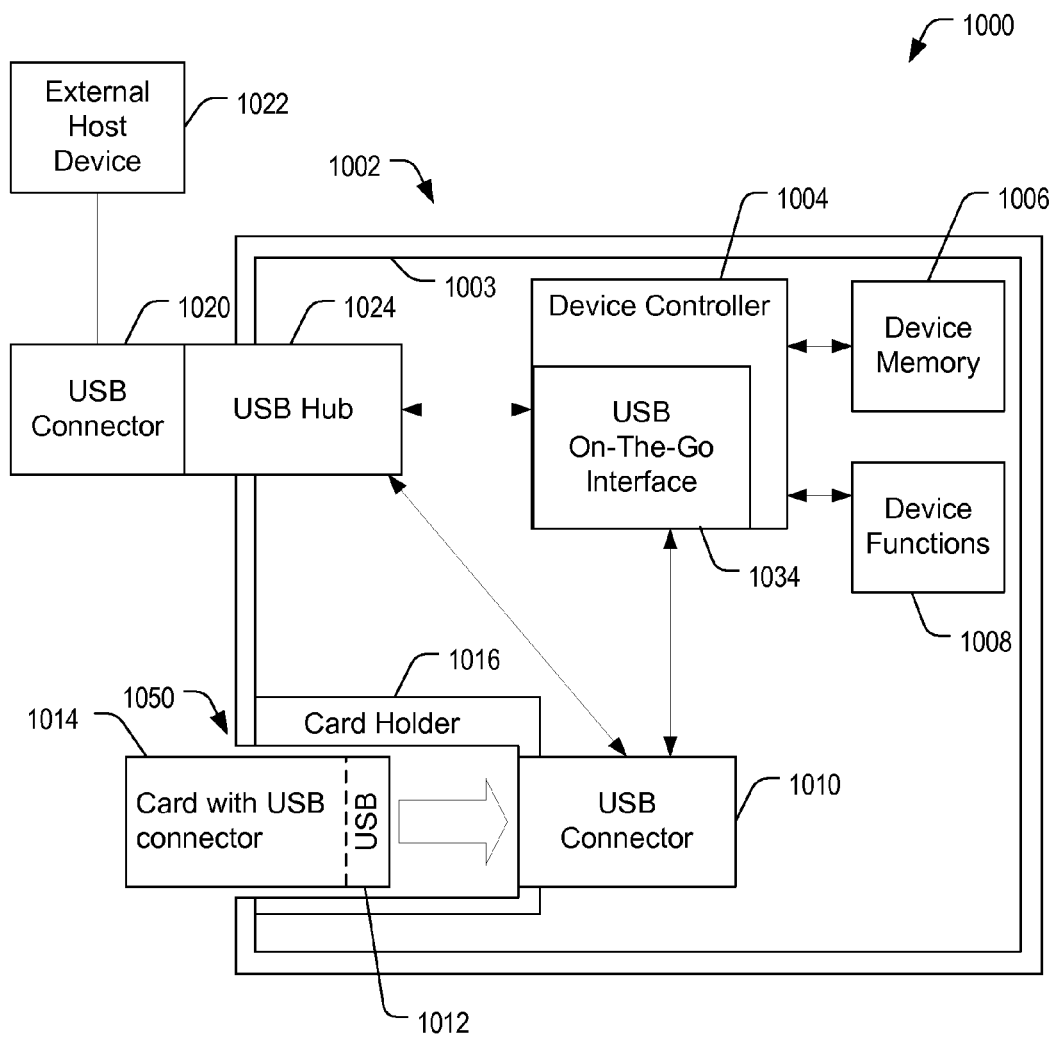
FIG. 10 is a block diagram of a second illustrative embodiment of a system including a card holder to receive a memory card having a USB interface.

Referring to FIG. 10, a second particular embodiment of a system to receive and interact with a memory card having a USB interface is depicted and generally designated 1000. The system 1000 includes a device 1002 that is coupled to an external host device 1022 and the device 1002 is configured to receive a memory card 1014 having a USB connector 1012. In a particular embodiment, the memory card 1014 is the card 101 of FIG. 1, the memory card 201 of FIG. 2, the memory card 301 of FIG. 3, the memory card 401 of FIG. 4, or the memory card 501 of FIG. 5.

In a particular embodiment, the device 1002 includes a housing 1003 that encloses a device controller 1004. A device memory 1006 and device functions 1008 are accessible to the device controller 1004. The device 1002 also includes a first USB connector 1010 that may be secured within the housing 903, such as a USB plug or a USB receptacle that is coupled to the device controller 1004. In a particular embodiment, the first USB connector 1010 may be compliant with a USB micro-B physical specification, such as a USB 2.0 micro-B plug or a USB 3.0 micro-B plug. The first USB connector 1010 and the device controller 1004 are also coupled to a USB hub 1024.

The housing 1003 at least partially encloses a card holder 1016. The housing 1003 has an opening 1050 that is dimensioned to enable insertion of the memory card 1014 into the card holder 1016. The card holder 1016 may be dimensioned to receive and to hold a card having a shape and size form factor complying with a memory card specification, such as the memory card 1014 with the USB connector 1012. The first USB connector 1010 may be configured to electrically connect or couple to the USB connector 1012 of the memory card 1014 when the memory card 1014 is inserted within the card holder 1016.

In a particular embodiment, the device controller 1004 includes a USB interface 1034 that is capable of functioning as a USB device interface in response to determining that the external host device 1022 is coupled to the USB hub 1024. The USB interface 1034 is also capable of functioning as a host interface to the memory card 1012 via the first USB connector 1010 in response to determining that the external host device 1022 is not coupled to the USB hub 1024. In a particular embodiment, the USB interface 1034 is a USB On-The-Go (OTG) interface.

As a result, when the external host device 1022 is not coupled to the USB hub 1024, the USB interface 1034 functions as a host to the memory card 1014 that is held at the card holder 1016. However, when the external host device 1022 is coupled to the USB hub 1024 via a USB connector 1020, the USB interface 1034 is reconfigured to act as a USB device interface, such that the external host device 1022 may interact with the device controller 1004 as a USB device and may further interact with the memory card 1014 as a second USB device via the first and second USB connectors 1010 and 1012, respectively.

Figure 11:
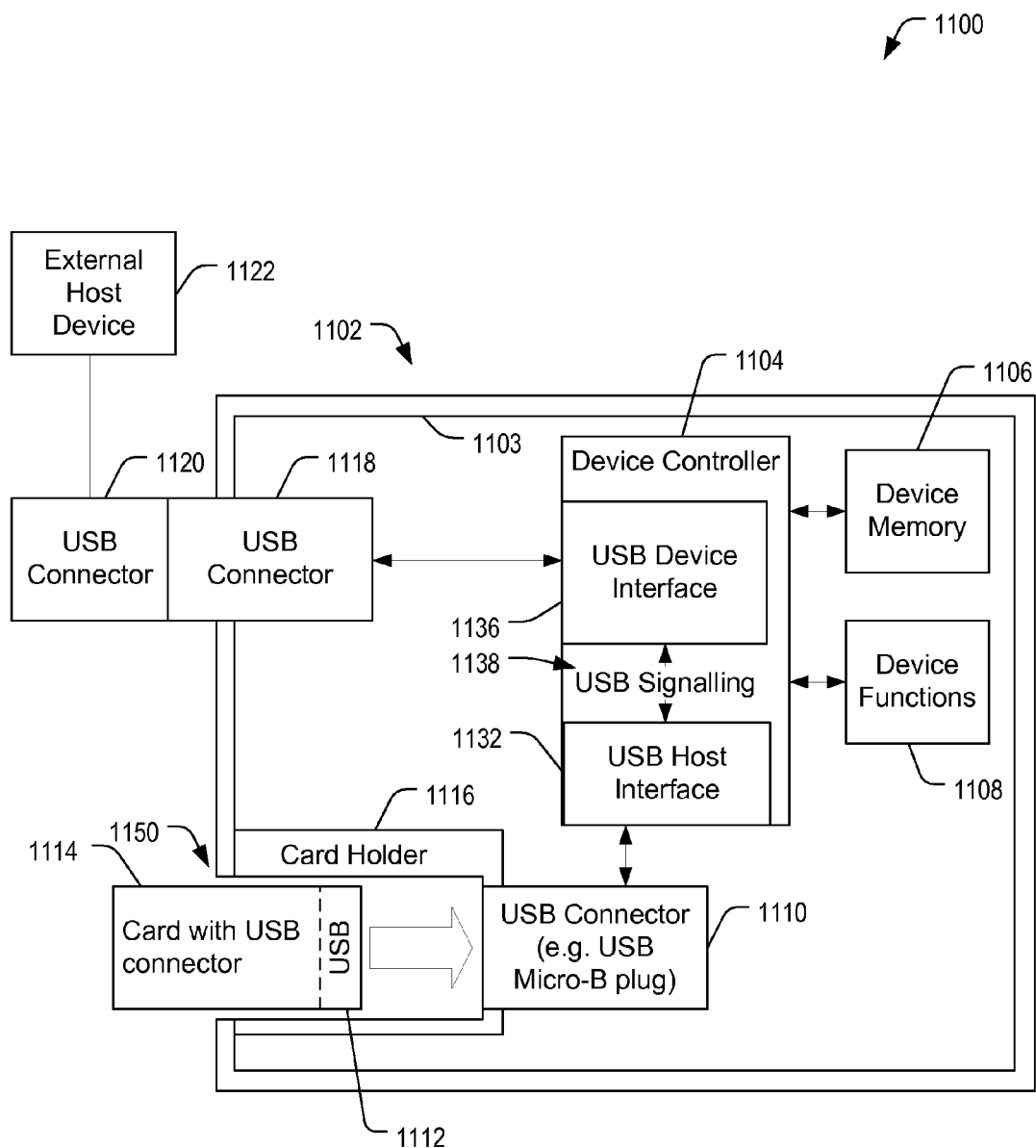
FIG. 11 is a block diagram of a third illustrative embodiment of a system including a card holder to receive a memory card having a USB interface.

Referring to FIG. 11, a third particular embodiment of a system to receive and interact with a memory card with a USB interface is depicted and generally designated 1100. The system 1100 includes a device 1102 coupled to an external host device 1122. The device 1102 includes a card holder 1116 that is configured and dimensioned to receive a memory card 1114 having a USB connector 1112. In a particular embodiment, the memory card 1114 is the card 101 of FIG. 1, the memory card 201 of FIG. 2, the memory card 301 of FIG. 3, the memory card 401 of FIG. 4, or the memory card 501 of FIG. 5.

The device 1102 includes a housing 1103 that encloses a device controller 1104. A device memory 1106 and one or more device functions 1108 are accessible to the device controller 1104. The device controller 1104 is also coupled to a first USB connector 1110. For example, the first USB connector 1110 may be a USB 3.0 micro-B plug.

The housing 1103 also at least partially encloses the card holder 1116. The housing 1103 has an opening 1150 that is dimensioned to enable insertion of the memory card 1114 into the card holder 1116. The card holder 1116 may be dimensioned to receive and to hold a card having a shape and size form factor complying with a memory card specification, such as the memory card 1114 having the USB connector 1112.

The first USB connector 1110 may be configured to couple to a second USB connector, such as the USB connector 1112 of the memory card 1114 when the memory card 1114 is inserted within the card holder 1116. The device 1102 also includes a third USB connector 1118 that is coupled to the device controller 1104 and that is configured to be connected to the external host device 1122 via a USB connector 1120.

In a particular embodiment, the device controller 1104 includes a USB device interface 1136 that is coupled to the third USB connector 1118. The USB device interface 1136 enables the external host device 1122 to interact with the device 1102, and in particular, to access the device memory 1106 and the device functions 1108. The device controller 1104 also includes a USB host interface 1132 that is coupled to function as a host to the memory card 1114 when the memory card 1114 is inserted into the card holder 1116 such that the first USB connector 1110 is coupled to the USB connector 1112 of the memory card 1114.

The device controller 1104 is configured to mediate access of the external host device 1122 to the memory card 1114 via the USB host interface 1132. In a particular embodiment, the device controller 1104 is configured to receive USB instructions and formatted data provided by the external host device 1122 and received via the USB device interface 1136. The USB instructions may include instructions to access memory or other functions at the memory card 1114. The USB instructions may be routed to the first USB connector 1110 via the USB host interface 1132. For example, the device controller 1104 may be configured to pass USB signaling 1138 from the device interface 1136 to the USB host interface 1132, from which the USB host interface 1132 may provide the USB signaling 1138 to the memory card 1114. Thus, the device controller 1104 may act as a pass-through mechanism to enable the external host device 1122 to access a memory within the memory card 1114, without translation of USB protocol instructions from the external host device 1122 to another protocol format.

In a particular embodiment, the device controller 1104 presents the memory card 1114 to the external host device 1122 by implementing a device interface for the memory card 1114. In another embodiment, the device controller 1104 may be configured to enable communication of the external host device 1122 to the memory card 1114 without implementing a separate device interface for the memory card 1114 Instead, the device controller 1104 may perform a memory mapping operation to map instructions from the external host device 1122 to the USB host interface 1132 to be directed to the memory card 1114.

Figure 12:
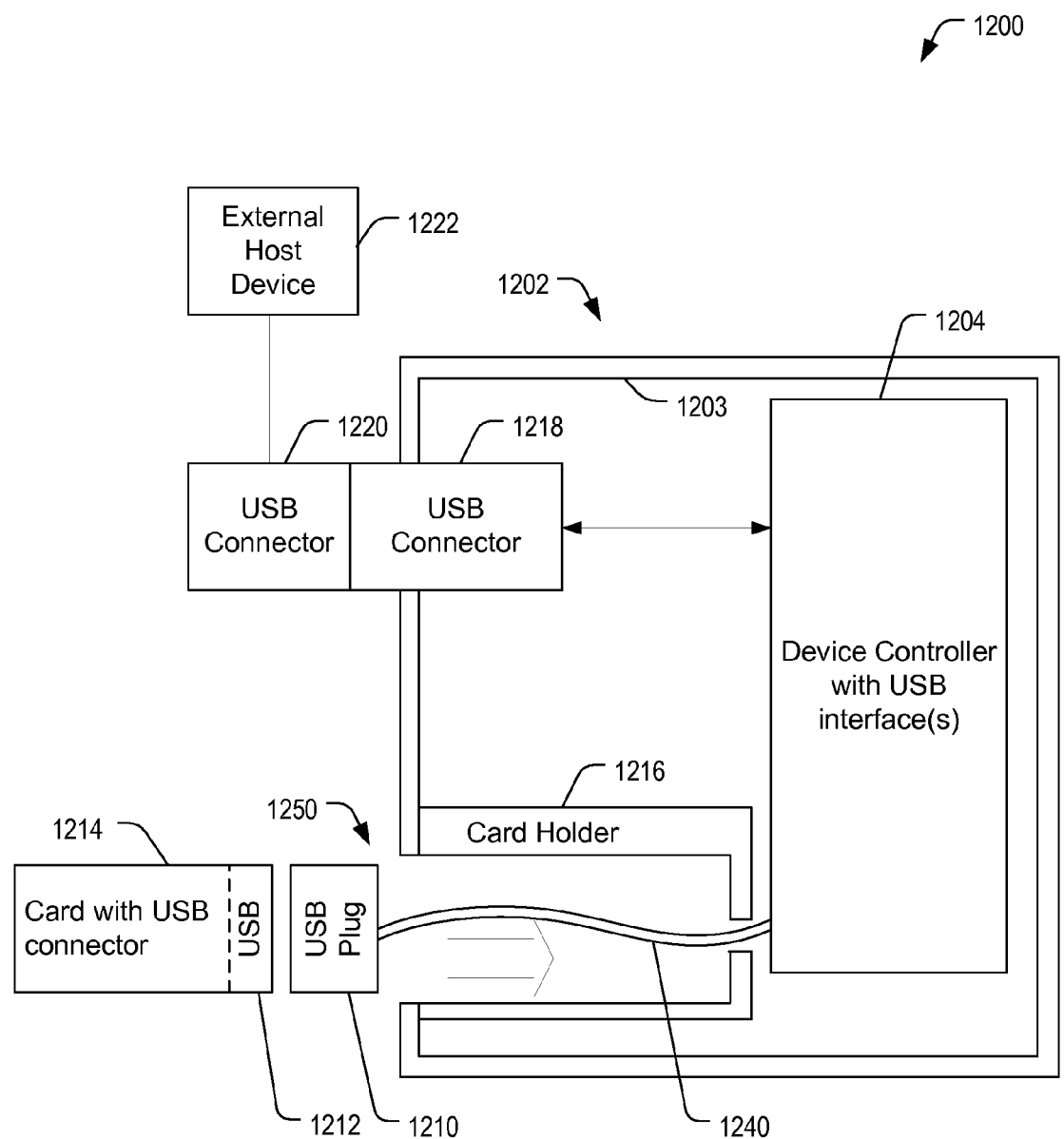
FIG. 12 is a block diagram of a fourth illustrative embodiment of a system including a card holder to receive a memory card having a USB interface.

Referring to FIG. 12, a fourth illustrative embodiment of a system to receive and to interact with a memory card having a USB connector is depicted and generally designated 1200. The system 1200 includes a device 1202 coupled to an external host device 1222 and configured to be connected to a memory card 1214 having a USB connector 1212. In a particular embodiment, the memory card 1214 is the card 101 of FIG. 1, the memory card 201 of FIG. 2, the memory card 301 of FIG. 3, the memory card 401 of FIG. 4, or the memory card 501 of FIG. 5.

The device 1202 includes a housing 1203 enclosing a device controller 1204 having one or more USB interfaces. The device 1202 also includes a card holder 1216 that is dimensioned to receive the memory card 1214. A USB connector, such as a USB plug 1210, is coupled to the device controller 1204 via a flexible cable 1240. The cable 1240 has sufficient length to enable the USB plug 1210 to exit through an opening 1250 in the housing 1203. The USB plug 1210 may be extended outside the card holder 1216 via the opening 1250 for a user to manually attach the USB plug 1210 to the USB connector 1212 of the memory card 1214. After attaching the USB plug 1210 to the memory card 1214, the memory card 1214 may be inserted into the card holder 1216 for operation with the device 1202.

The device 1202 also includes a USB connector 1218 that is configured to couple to the external host device 1222 via a USB connector 1220. In a particular embodiment, the device controller 1204 enables the external host device 1222 to interact with the memory card 1214, and when the external host device 1222 is not coupled to the USB connector 1218, the device controller 1204 can access the card 1214 via a USB host interface. To illustrate, the device controller 1204 may be the device controller 904 of FIG. 9, the device controller 1004 of FIG. 10, or the device controller 1104 of FIG. 11, as illustrative, non-limiting examples.

Although the devices of FIGS. 9-12 are illustrated and described as having USB connectors, in other embodiments one or more of the devices of FIGS. 9-12 may instead use connectors compatible with the IEEE 1394 interface protocol. For example, in a particular embodiment, a device, such as the device 902 of FIG. 9, may include a first connector, such as the first connector 910, that is compatible with an IEEE 1394 interface standard and a card holder, such as the card holder 916 associated with the first connector. The controller 904 is coupled to the first connector, and the housing 903 encloses the controller and at least partially encloses the card holder. The housing 903 has an opening 950 that is dimensioned to enable insertion of a memory card into the card holder 916. The first connector may be configured to connect to a second connector of the memory card when the memory card is inserted into the card holder, where the second connector is compatible with the IEEE 1394 interface standard. As illustrative, non-limiting examples, the memory card may be the memory card 601 of FIG. 6, the memory card 701 of FIG. 7, or the memory card 801 of FIG. 8. For example, the card holder may include hardware adapted to receive and hold a card having a form factor that is compliant with a flash memory card specification, the card further having an electrical connector portion of a receptacle that is compatible with the IEEE 1394 interface standard within an edge connector portion of the card. As another example, the card holder may include hardware adapted to receive and hold a card having a form factor that is compliant with a Personal Computer Memory Card International Association (PCMCIA) specification, where the card includes an electrical connector portion of a receptacle that is compatible with the IEEE 1394 interface standard within an edge connector portion of the card.

Figure 13:
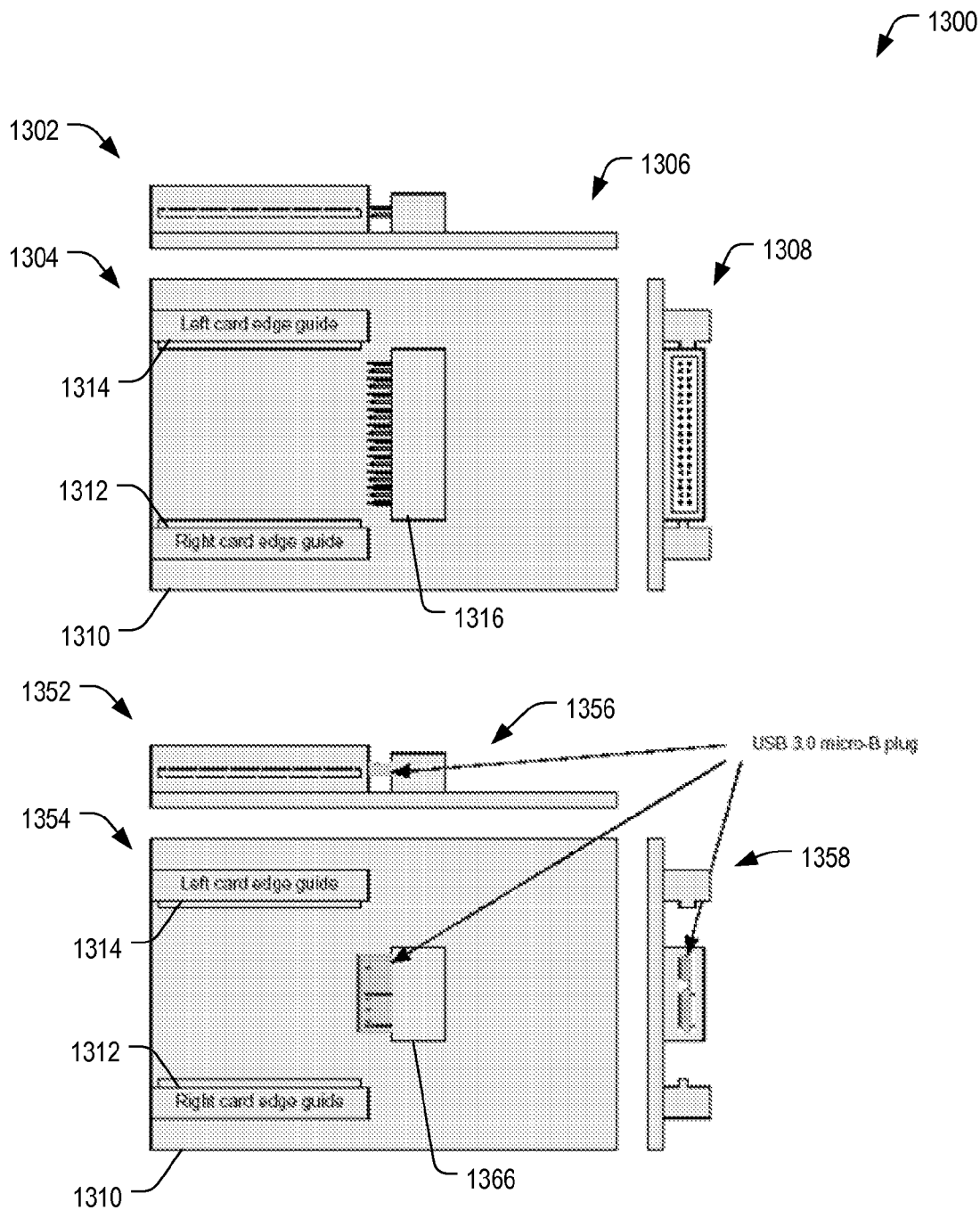
FIG. 13 is a general diagram of a first illustrative embodiment of a memory card holder dimensioned to hold a memory card having a USB or IEEE 1394 interface.

Referring to FIG. 13, an illustration 1300 including an embodiment of a memory card holder that is dimensioned to receive and hold a memory card having a USB or IEEE 1394 interface is depicted. A memory card hardware apparatus 1302 is illustrated in a top view 1304, a side view 1306, and a front view 1308. The memory card hardware apparatus 1302 includes a memory card holder formed of a right card edge guide 1312 and a left card edge guide 1314. The card edge guides 1312 and 1314 are positioned and dimensioned to receive an inserted memory card to connect to a PCMCIA connector 1316.

A USB or IEEE 1394 memory card hardware apparatus 1352 in accordance with an embodiment of the present disclosure is illustrated in a top view 1354, a side view 1356, and a front view 1358. The USB or IEEE 1394 memory card apparatus 1352 includes the memory card holder formed of the right card edge guide 1312 and the left card edge guide 1314 of the memory card apparatus 1302. The card edge guides 1312 and 1314 are positioned and dimensioned to receive an inserted memory card to connect to a connector 1366. The connector 1366 is positioned relative to the card holder to be coupled to a memory card when the memory card is within the memory card holder. In a particular embodiment, the connector 1366 may be a USB connector, such as a USB 2.0 micro-B plug or a USB 3.0 micro-B plug. In another embodiment, the connector 1366 may be an IEEE 1394 connector (not shown).

In a particular embodiment, the memory card holder includes hardware such as the card edge guides 1312 and 1314 adapted to hold a card having a form factor that is compliant with a flash memory card specification, in one embodiment, or a PCMCIA specification, in another embodiment, and also having an electrical connector portion of a USB compatible receptacle within an edge of the card. For example, the memory card hardware apparatus 1352 including the memory card holder formed of the right card edge guide 1312 and the left card edge guide 1314 may be adapted to hold any of the memory cards depicted in FIGS. 1-5. In a particular embodiment, the memory card holder of the memory card hardware apparatus 1352 may be the card holder 916 of FIG. 9, the card holder 1016 of FIG. 10, the card holder 1116 of FIG. 11, or the card holder 1216 of FIG. 12.

Figure 14:
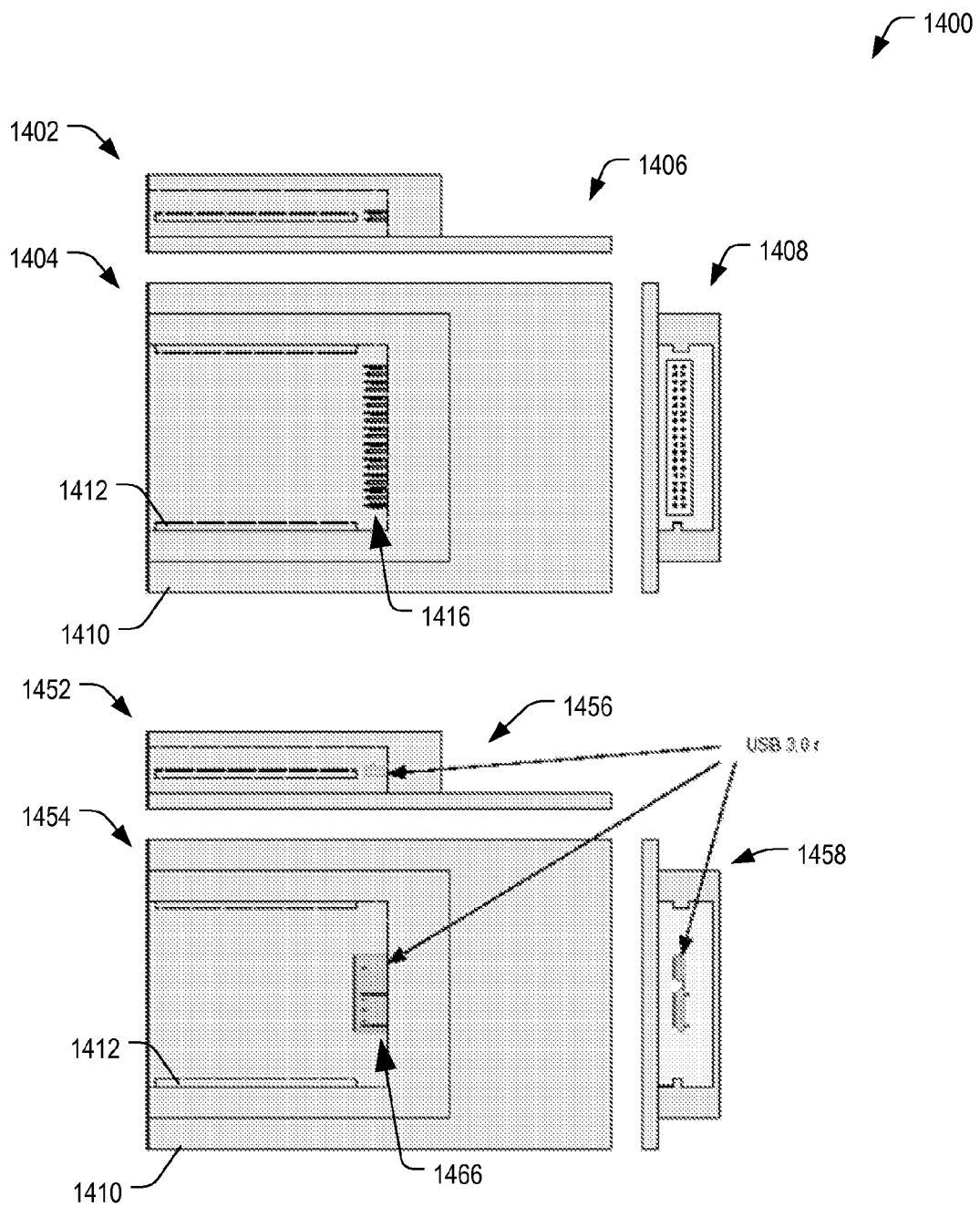
FIG. 14 is a general diagram of a second illustrative embodiment of a memory card holder dimensioned to hold a memory card having a USB or IEEE 1394 interface.

Referring to FIG. 14, an illustration 1400 including an embodiment of a memory card holder dimensioned to receive and hold a memory card having a USB or IEEE 1394 interface is depicted. A memory card hardware apparatus 1402 is illustrated in a top view 1404, a side view 1406, and a front view 1408. The memory card hardware apparatus 1402 includes a memory card holder 1412 that is positioned and dimensioned to receive an inserted memory card to connect to a PCMCIA connector 1416 that is integrated within the memory card holder 1412.

A USB or IEEE 1394 memory card hardware apparatus 1452 in accordance with an embodiment of the present disclosure is illustrated in a top view 1454, a side view 1456, and a front view 1458. The USB or IEEE 1394 memory card hardware apparatus 1452 includes the memory card holder 1412 of the memory card hardware apparatus 1402; however, rather than having the integrated PCMCIA connector 1416, the memory card holder 1412 has an integrated connector 1466. The connector 1466 is positioned relative to the card holder 1412 to be coupled to a memory card when the memory card is within the memory card holder. In a particular embodiment, the integrated connector 1466 is a USB connector, such as a USB 2.0 micro-B plug or a USB 3.0 micro-B plug. In another embodiment, the integrated connector 1466 is an IEEE 1394 connector (not shown).

In a particular embodiment, the memory card holder 1412 includes hardware such as card edge guides adapted to hold a card having a form factor that is compliant with a flash memory card specification, in one embodiment, or a PCM-CIA specification, in another embodiment, and also having an electrical connector portion of a USB compatible receptacle recessed within an edge portion of the card. For example, the memory card hardware apparatus 1452 including the memory card holder 1412 with the integrated connector 1466 may be adapted to hold any of the memory cards depicted in FIGS. 1-5. In a particular embodiment, the memory card holder 1412 may be the card holder 916 of FIG. 9, the card holder 1016 of FIG. 10, the card holder 1116 of FIG. 11, or the card holder 1216 of FIG. 12.

Figure 15:
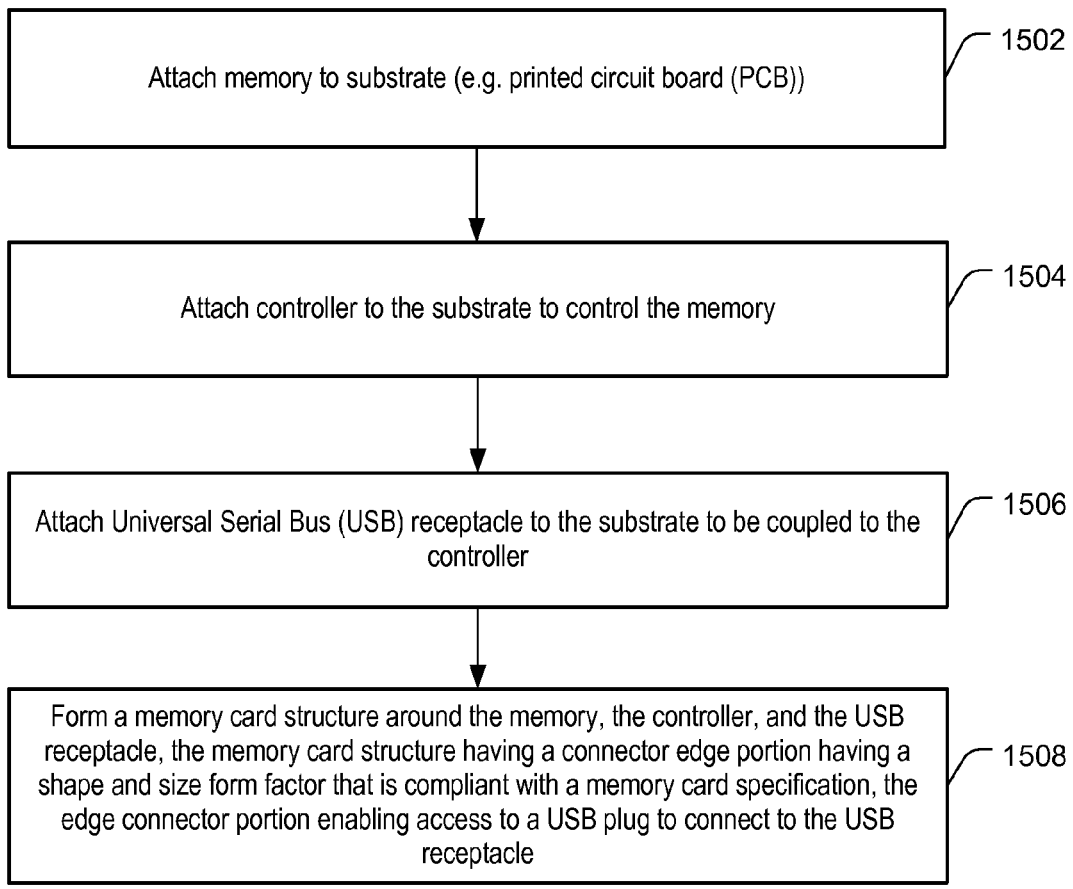
FIG. 15 is a flow diagram of a particular embodiment of a method of making a memory card having a USB interface.

Referring to FIG. 15, a flow diagram of a particular embodiment of a method of making a memory card having a USB interface is depicted and generally designated 1500. The method 1500 may include attaching a memory to a substrate, at 1502. For example, the substrate may include a printed circuit board (PCB), such as the PCB 310 of FIG. 3. In another embodiment, the substrate may be the substrate 408 of FIG. 4.

A controller may be attached to the substrate, at 1504. The controller may be configured to control a memory. For example, the controller may be the controller circuitry 106 of FIG. 1. As another example, the controller may be the controller 312 of FIG. 3.

A Universal Serial Bus (USB) receptacle may be attached to the substrate to be coupled to the controller, at 1506. For example, the USB receptacle may comply with a USB micro-B specification, such as a USB 2.0 micro-B specification or a USB 3.0 micro-B specification. As another example, the USB receptacle may substantially comply with a USB micro-B specification other than at least one insertion guide. As another example, the USB receptacle may have an electrical connector portion that complies with a USB Micro-B specification but may not include a conductive shield portion. As illustrative, non-limiting examples, the USB receptacle may be the receptacle 132 of FIG. 1, the receptacle 230 of FIG. 2, the receptacle 302 of FIG. 3, the receptacle 508 of FIG. 5, or another receptacle. The USB receptacle is attached to the substrate to remain stationary with respect to the memory and the controller.

A memory card structure may be formed around the memory, the controller, and the USB receptacle, at 1508. The memory card structure may have an edge connector portion having a shape and size form factor that is compliant with a memory card specification. The edge connector portion may enable access to a USB plug to form a connection to the USB receptacle. In a particular embodiment, forming the memory card structure may include assembling a shell that encloses the memory and the controller and that forms an opening to enable access to the USB receptacle. For example, assembling the shell may include joining the shell top 316 and the shell bottom 318 of FIG. 3. In another embodiment, forming the memory card structure may include forming a top layer on the substrate, such as the top layer 410 on the substrate 408 of FIG. 4.

Figure 16:
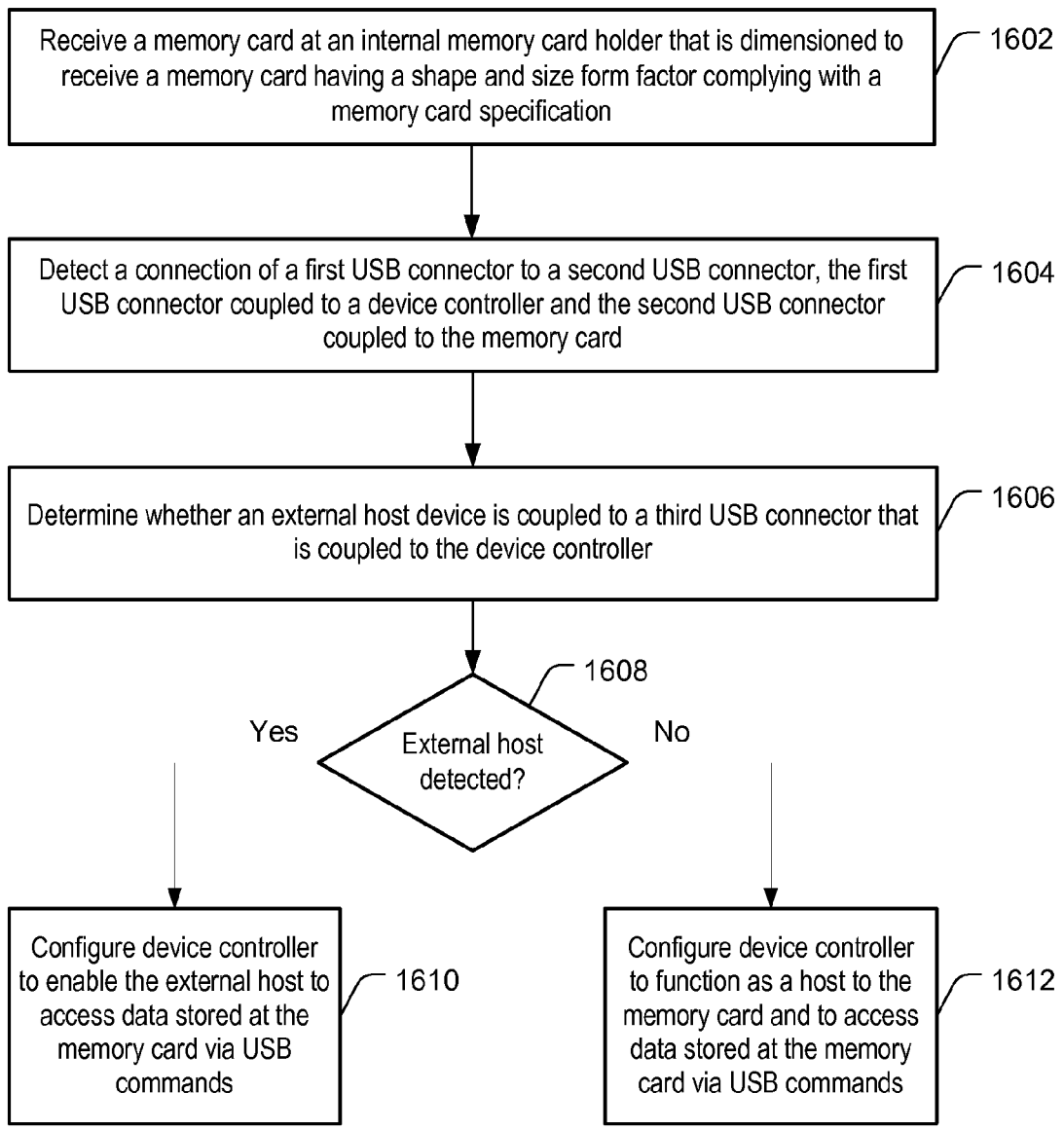
FIG. 16 is a flow diagram of a particular embodiment of a method of selecting a host to communicate with a memory card having a USB interface.

Referring to FIG. 16, a flow diagram of a particular embodiment of a method of selecting a host to communicate with a memory card having a USB interface is depicted and generally designated 1600. In an illustrative embodiment, the method 1600 may be performed by a device that is configured to couple to an external host via a USB interface and that is configured to couple to a memory card via a USB interface. In a particular embodiment, the method 1600 may be performed by the device 902 of FIG. 9, the device 1002 of FIG. 10, the device 1102 of FIG. 11, or the device 1202 of FIG. 12

A memory card may be received at a memory card holder that is dimensioned to receive and hold a memory card having a shape and size form factor complying with a memory card specification, at 1602. As illustrative, non-limiting examples, the memory card holder may be the card holder 916 of FIG. 9, the card holder 1016 of FIG. 10, the card holder 1116 of FIG. 11, the card holder 1216 of FIG. 12, a card holder including the card edge guides 1312 and 1314 of FIG. 13, the card holder 1412 of FIG. 14, or another card holder.

A connection of a first Universal Serial Bus (USB) connector to a second USB connector may be detected, at 1604. The first USB connector may be coupled to a device controller and the second USB connector may be coupled to a memory card within a memory card holder.

A determination may be made whether an external host is coupled to the device controller, at 1606. In response to detecting the external host, at 1608, the device controller may be configured to enable the external host to access data stored at the memory card via USB commands, at 1610. In a particular embodiment, the external host is coupled to the device controller via a third USB connector.

In response to not detecting the external host, the device controller may be configured to function as a host to the memory card, at 1612. In a particular embodiment, configuring the device controller to function as the host enables the device controller to access data stored at the memory card via USB commands.

Communication between the external host and the device controller and communications between the device controller and the memory card may comply with a USB communication protocol. The device controller may use pass-though USB signaling, as described with respect to FIG. 11, or may implement a USB On-The-Go (OTG) interface, as described with respect to FIG. 10, as illustrative, non-limiting examples. As a result, the device controller may enable communications between the external host and the memory card without devoting processing resources for translation of commands and data between different protocols.

Figure 17:
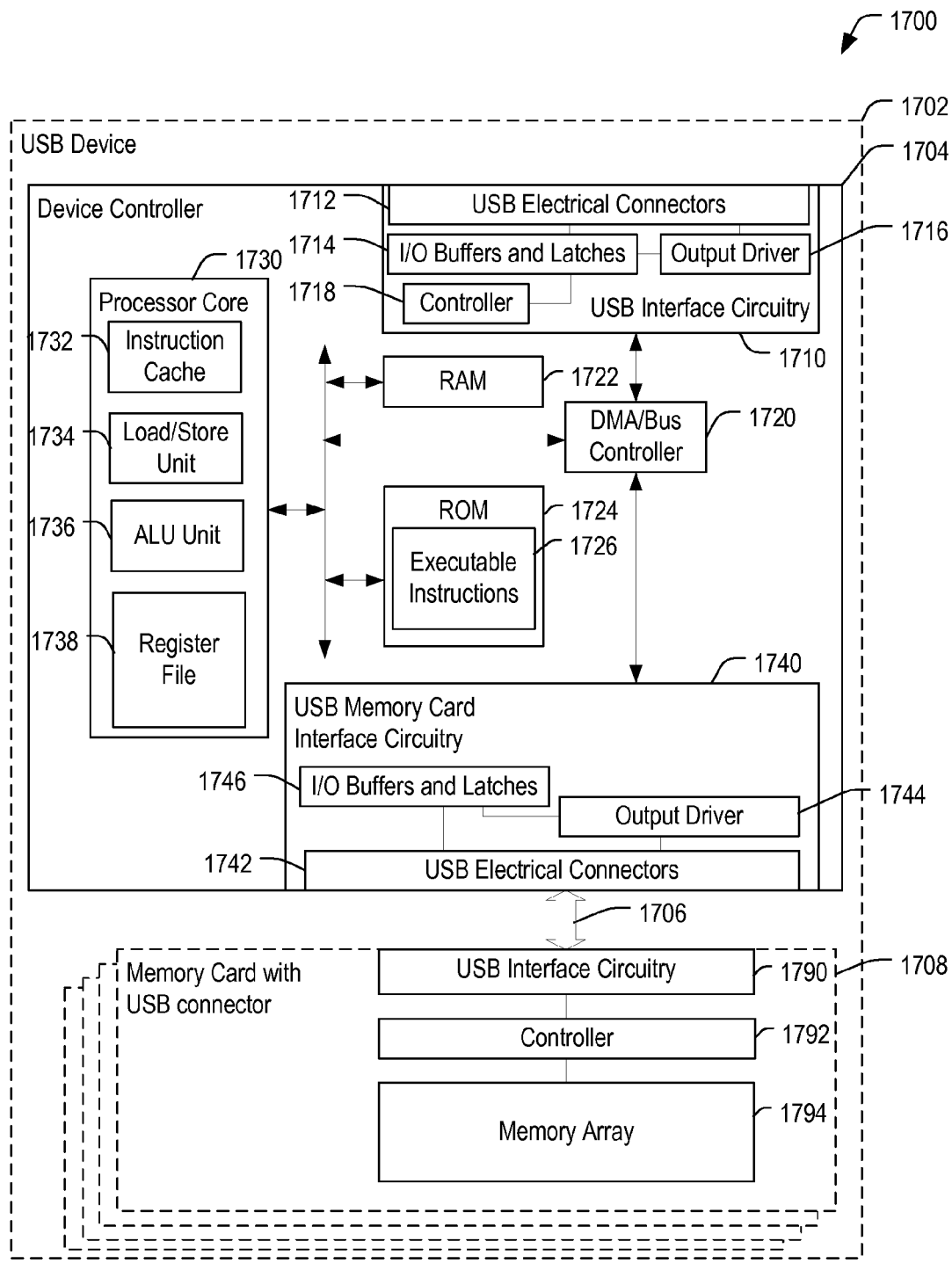
FIG. 17 is a block diagram of an illustrative system that can be used to enable access to a memory card via a USB interface.

Referring to FIG. 17, an illustrative embodiment of a system that can be used to enable access to a memory via a USB interface is depicted and generally designated 1700. The system 1700 includes a device 1702 that includes a device controller 1704 coupled to one or more memory cards having USB connectors, such as a representative memory card 1708 having a USB connector, via a universal serial bus 1706. The representative memory card 1708 having the USB connector includes USB interface circuitry 1790 to communicate via the universal serial bus 1706. The memory card 1708 having the USB connector also includes a controller 1792 that is coupled to the USB interface circuitry 1790 and that is also coupled to a memory, such as a memory array 1794. The memory array 1794 may include one or more types of storage media such as a flash memory, a one-time programmable memory, other memory, or any combination thereof. In a particular embodiment, the device 1702 may be the device 902 of FIG. 9, the device 1002 of FIG. 10, the device 1102 of FIG. 11, or the device 1202 of FIG. 12. In an illustrative embodiment, the memory card 1708 having the USB connector may be any of the memory cards depicted in FIGS. 1-5. In addition, the memory card 1708 having the USB device is be held at a memory card holder, such as any of the card holders of FIGS. 9-14.

In a particular embodiment, the device controller 1704 includes USB interface circuitry 1710 coupled to a direct memory access (DMA)/bus controller 1720. The device controller 1704 also includes USB memory card interface circuitry 1740 that is coupled to the DMA/bus controller 1720. A processor core 1730, a random access memory (RAM) 1722 and a read-only memory (ROM) 1724 are coupled to the DMA/bus controller 1720 via an internal bus.

In a particular embodiment, the USB interface circuitry 1710 includes USB electrical connectors 1712 coupled to input/output (I/O) buffers and latches 1714. The bus connectors 1712 are further coupled to output driver circuitry 1716. The USB interface circuitry 1710 also includes a controller 1718. In a particular embodiment, the USB interface circuitry 1710 operates in accordance with a universal serial bus (USB) protocol. For example, the controller 1718 may be programmed to receive USB protocol instructions and data from an external host device, such as the external host device 922 of FIG. 9, the external host device 1022 of FIG. 10, the external host device 1122 of FIG. 11, or the external host device 1222 of FIG. 12, via the USB electrical connectors 1712 that are coupled to a universal serial bus. The controller 1718 may include a hardware processor that executes instructions stored at an internal memory, such as a read-only memory (not shown) to enable receipt and acknowledgment of USB instructions and data.

In a particular embodiment, the processor core 1730 includes an instruction cache 1732, a load/store unit 1734, an arithmetic logic unit (ALU) unit 1736, and a register file 1738. The processor core 1730 may include, or may function substantially similarly to, an ARM core, as an illustrative, non-limiting example. For example, the processor core 1730 may support a reduced instruction set computer (RISC) micro-architecture. The processor core 1730 may be configured to retrieve data and executable instructions 1726 via the load/store unit 1734 from the read only memory 1724. The executable instructions 1726 may include instructions that are executable to run at least a portion of the host enable/disable module 930 of FIG. 9, the USB host interface 932 of FIG. 9, the USB On-The-Go interface 1034 of FIG. 10, the USB signaling 1138 between the USB device interface 1136 and the USB host interface 1132 of FIG. 11, or any combination thereof.

Alternatively, or in addition, at least some of the executable instructions 1726 may not be stored at the ROM 1724 and may instead be stored at the memory array 1794. The executable instructions 1728 may be retrieved from the memory array 1794 and stored at the RAM 1722. The processor core 1730 may be configured to retrieve the executable instructions 1728 from the RAM 1722 for execution.

One or more executable instructions 1726 may be retrieved by the load/store unit 1734 and stored to the instruction cache 1732. The instructions at the instruction cache 1732 may be scheduled and provided to one or more execution pipelines, such as an execution pipeline including the ALU unit 1736. The ALU unit 1736 may include dedicated circuitry to perform arithmetic and logic operations, such as addition and subtraction, AND, NOT, OR, exclusive-OR (XOR), other arithmetic or logic operations, or any combination thereof. The ALU unit 1736 may receive data from, and write data to, the register file 1738. The register file 1738 may include multiple memory cells that may provide high speed access to the processor core 1730 of data to be used for execution of instructions.

In a particular embodiment, the processor core 1730 may be programmed to perform at least a portion of the method 1600 of FIG. 16. For example, the processor core 1730 may be programmed to detect a connection of the memory card 1708 having the USB connector to the USB memory interface circuitry 1740 and to determine whether an external host device is coupled to a USB connector that includes the USB electrical connectors. 1412 of the USB interface circuitry 1710. When the external host is detected, the processor core 1730 may configure the device controller 1704 to enable the external host to access data stored at the memory card 1708 having the USB connector via USB commands. When the external host is not detected, the processor core 1730 may configure the device controller 1704 to function as a host to the memory card 1708 having the USB connector via the USB memory card interface circuitry 1740.

The USB memory card interface circuitry 1740 may include USB electrical connectors 1742, an output driver 1744, and input/output buffers and latches 1746. The data bus connectors 1742 may include electrical connectors to enable electrical signal propagation via the universal serial bus 1706. The I/O buffers and latches 1746 may be configured to store data that is received via the DMA/bus controller 1720 to be transmitted via the universal serial bus 1706 using electrical signals at the USB electrical connectors 1742 that are generated by the output driver 1744. In addition, or alternatively, the I/O buffers and latches 1746 may store data values represented by electrical signals received at the USB electrical connectors 1742 via the data universal serial bus 1706, such as signals generated by the USB interface circuitry 1790 of the memory card 1708 having the USB connector. Alternately, the device controller 1704 may provide an electrical connection between the USB electrical connectors 1712 and the USB electrical connections 1742 to provide a connection between the USB connectors allowing command and data transfer without processing by the device controller 1704.

Although various components depicted herein are illustrated as block components and described in general terms, such components may include one or more microprocessors, state machines, or other circuits configured to enable the disclosed data storage devices, such as the memory card 101 of FIG. 1, to perform the particular functions attributed to such components. For example, the USB interface 104, the controller circuitry 106, or both, of FIG. 1, may represent physical components, such as controllers, state machines, logic circuits, or other structures to enable the memory card 101 to receive and respond to requests from a host device or from other external devices to access the memory 108.

For example, the controller circuitry 106 of FIG. 1 may be implemented using a microprocessor or microcontroller programmed to respond to data access commands received via the USB interface 104. In a particular embodiment, the controller circuitry 106 of FIG. 1 includes executable instructions that are executed by a processor and the instructions may be stored at the memory 108. Alternatively, or in addition, executable instructions that are executed by the processor may be stored at a separate memory location that is not part of the memory 108, such as at a read-only memory (ROM) (not shown) at the controller circuitry 106.

In a particular embodiment, the memory card 101 having the USB interface may be a portable device configured to be selectively coupled to one or more external devices. However, in other embodiments, the memory card 101 having the USB interface may be attached or embedded within one or more host devices, such as within a housing of a portable communication device. For example, the data memory card 101 having the USB interface may be within a packaged apparatus such as a wireless telephone, personal digital assistant (PDA), gaming device or console, portable navigation device, or other device that uses internal non-volatile memory. In a particular embodiment, the memory card 101 having the USB interface includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
a first Universal Serial Bus (USB) connector;
a card holder dimensioned to receive a memory card that includes a second USB connector and that has a shape and size form factor compliant with a flash memory card specification, a Personal Computer Memory Card International Association (PCMCIA) specification, a CompactFlash (CF) specification, a multimedia card (MMC) specification, an SD flash memory card specification, a miniSD flash memory card specification, or a microSD flash memory card specification;
wherein the first USB connector is positioned to electrically couple with the second USB connector while the memory card is held in the card holder; and
a third USB connector electrically coupled to the first USB connector, the third USB connector configured to be coupled to an external host device, wherein detecting electrical power supplied via the third USB connector to a power line indicates that the third USB connector is coupled to the external host device;
wherein upon detecting that the electrical power is being supplied to the power line via the third USB connector, the third USB connector is configured to enable the external host device to access data associated with the memory card via the first USB connector conditioned on the memory card being electrically coupled to the first USB connector.

2. The apparatus of claim 1, wherein the first USB connector is integrated with the card holder.

3. The apparatus of claim 1, wherein the card holder includes hardware adapted to hold the memory card having the shape and size form factor that is compliant with the flash memory card specification.

4. The apparatus of claim 1, wherein the card holder includes hardware adapted to hold the memory card having the shape and size form factor that is compliant with the Personal Computer Memory Card International Association (PCMCIA) specification.

5. The apparatus of claim 1, wherein the first USB connector includes a USB plug or a USB receptacle.

6. The apparatus of claim 5, wherein the USB plug is compliant with a USB Micro-B physical specification.

7. The apparatus of claim 1, wherein the card holder includes hardware adapted to hold the memory card having the shape and size form factor that is compliant with the CompactFlash (CF) specification.

8. The apparatus of claim 1, wherein the card holder includes hardware adapted to hold the memory card having the shape and size form factor that is compliant with the SD flash memory card specification.

9. The apparatus of claim 1, wherein the card holder includes hardware adapted to hold the memory card having the shape and size form factor that is compliant with the microSD flash memory card specification.

10. The apparatus of claim 1, wherein the first USB connector is secured to the card holder.

11. The apparatus of claim 1, wherein the first USB connector is attached to a cable that is coupled to a USB host interface, and wherein the cable has a length that is sufficient to enable the first USB connector attached to the cable to exit the card holder at an opening.

12. The apparatus of claim 1,
wherein the third USB connector is electrically coupled to a device controller;
wherein the device controller is configured to enable a USB host interface to operate as a USB host to the memory card in response to detecting that the external host device is not coupled to the third USB connector; and
wherein the device controller is configured to disable the USB host interface from operating as a USB host to the memory card in response to detecting that the external host device is coupled to the third USB connector.

13. An apparatus comprising:
a device controller including a Universal Serial Bus (USB) host interface;
a card holder;
a housing enclosing the device controller and at least partially enclosing the card holder, the housing having an opening that is dimensioned to enable insertion of a memory card into the card holder;

a first USB connector coupled to the USB host interface and configured to connect to a second USB connector of the memory card when the memory card is inserted into the card holder; and a third USB connector configured to be coupled to an external host device, wherein the third USB connector is electrically coupled to the device controller and further electrically coupled to the first USB connector, wherein the device controller, in response to detecting that the external host device is not coupled to the third USB connector, is configured to enable the USB host interface to operate as a USB host to the memory card; and wherein the device controller, in response to detecting that the external host device is coupled to the third USB connector, is configured to disable the USB host interface from operating as a USB host to the memory card.

14. The apparatus of claim 13, wherein the first USB connector includes a USB plug that is compliant with a USB Micro-B physical specification and wherein the card holder is configured to hold a card having a shape and size form factor that complies with a memory card specification.

15. The apparatus of claim 14, wherein the memory card specification is a flash memory card specification.

16. An apparatus comprising:
a device controller including a Universal Serial Bus (USB) interface that enables the device controller to switch between functioning as a USB host and functioning as a USB device;
a USB hub coupled to the USB interface of the device controller;
a card holder;
a housing enclosing the device controller and the USB hub and at least partially enclosing the card holder, the housing having an opening that is dimensioned to enable insertion of a memory card into the card holder;
a first USB connector coupled to the USB interface of the device controller and further coupled to the USB hub, wherein the first USB connector is configured to connect to a second USB connector of the memory card when the memory card is disposed within the card holder; and
a third USB connector coupled to the USB hub and configured to be connected to an external host device,
wherein the USB interface of the device controller is configured to function as the USB host to the memory card when the external host device is not coupled to the third USB connector and the USB interface of the device controller is configured to function as the USB device when the external host device is coupled to the third USB connector.

17. The apparatus of claim 16, wherein the first USB connector is stationary with respect to the card holder and wherein an insertion of a flash memory card that has a USB receptacle recessed in a portion of the flash memory card causes the third USB connector to connect to the USB receptacle.

18. The apparatus of claim 16, wherein the first USB connector is coupled to the USB interface via a cable and wherein a length of the cable enables the first USB connector to be coupled to a flash memory card that has a USB receptacle recessed in an edge connector portion of the flash memory card prior to the flash memory card being fully inserted into the card holder.

19. An apparatus comprising:
a device controller including a Universal Serial Bus (USB) host interface and a USB device interface;
a card holder;
a housing enclosing the device controller and at least partially enclosing the card holder, the housing having an opening that is dimensioned to enable insertion of a memory card into the card holder;
a first USB connector coupled to the USB host interface and configured to connect to a second USB connector of the memory card when the memory card is within the card holder;
a third USB connector configured to be coupled to an external host device, wherein the third USB connector is electrically coupled to the USB device interface of the device controller,
wherein the device controller is configured to mediate access of the external host device to the memory card via the USB host interface.

20. The apparatus of claim 19, wherein the device controller is configured to route USB commands received via the USB device interface to the first USB connector via the USB host interface.

21. The apparatus of claim 20, further comprising a memory coupled to the device controller, and wherein access is provided to the external host device to access the memory coupled to the device controller and to access a memory within the memory card.

22. An apparatus comprising:
a first connector compatible with an Institute of Electrical and Electronics Engineers (IEEE) 1394 interface standard;
a card holder associated with the first connector;
a controller coupled to the first connector; and
a housing enclosing the controller and at least partially enclosing the card holder, the housing having an opening that is dimensioned to enable insertion of a memory card into the card holder,
wherein the first connector is configured to connect to a second connector of the memory card when the memory card is inserted into the card holder, the second connector compatible with the IEEE 1394 interface standard.

23. The apparatus of claim 22, wherein the card holder includes hardware adapted to hold a card having a form factor that is compliant with a flash memory card specification, the card further having an electrical connector portion of a receptacle that is compatible with the IEEE 1394 interface standard within an edge connector portion of the card.

24. The apparatus of claim 22, wherein the card holder includes hardware adapted to hold a card having a form factor that is compliant with a Personal Computer Memory Card International Association (PCMCIA) specification, the card including an electrical connector portion of a receptacle that is compatible with the IEEE 1394 interface standard within an edge connector portion of the card.

25. A method comprising:
at a device with a memory card holder and a device controller, the device controller coupled to a first universal serial bus (USB) connector, performing:
detecting a connection of the first USB connector to a second USB connector while a memory card is coupled to the memory card holder, the memory card including the second USB connector; determining whether an external host is coupled to the device controller;
in response to determining that the external host is coupled to the device controller, configuring the device controller to enable the external host to access data stored at the memory card via USB commands; and in response to determining that the external host is not coupled to the device controller, configuring the device controller to function as a host to the memory card.

26. The method of claim 25, wherein the memory card holder is dimensioned to receive a card having a shape and size form factor complying with a memory card specification.

27. The method of claim 25, wherein configuring the device controller to function as the host enables the device controller to access data stored at the memory card via USB commands.

28. The method of claim 25, wherein the external host is coupled to the device controller via a third USB connector.

* * * * *